(12) United States Patent
Williams

(10) Patent No.: US 8,157,908 B2
(45) Date of Patent: Apr. 17, 2012

(54) THREE DIMENSIONAL PRINTING MATERIAL SYSTEM AND METHOD USING PEROXIDE CURE

(75) Inventor: Derek X. Williams, Berwick, ME (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 13/016,189

(22) Filed: Jan. 28, 2011

(65) Prior Publication Data

US 2011/0130489 A1      Jun. 2, 2011

Related U.S. Application Data

(62) Division of application No. 11/952,727, filed on Dec. 7, 2007, now Pat. No. 7,905,951.

(60) Provisional application No. 60/873,730, filed on Dec. 8, 2006.

(51) Int. Cl.
*C04B 14/00* (2006.01)

(52) U.S. Cl. .......... 106/400; 264/460; 264/463

(58) Field of Classification Search .......... 264/460, 264/463
See application file for complete search history.

(56) References Cited

U.S. PATENT DOCUMENTS

| | | | |
|---|---|---|---|
| 2,156,242 A | 4/1939 | Kharasch et al. |
| 2,296,636 A | 9/1942 | Hanahan |
| 2,522,548 A | 9/1950 | Streicher |
| 2,662,024 A | 12/1953 | Riddell et al. |
| 2,895,950 A | 7/1959 | Krieble |
| 3,297,601 A | 1/1967 | Maynard et al. |
| 3,303,147 A | 2/1967 | Elden |
| 3,309,328 A | 3/1967 | Carroll et al. |
| 3,476,190 A | 11/1969 | Jenny et al. |
| 3,525,632 A | 8/1970 | Enoch |
| 3,642,683 A | 2/1972 | Fry et al. |
| 3,821,006 A | 6/1974 | Schwartz |
| 3,835,074 A | 9/1974 | Desmarais |
| 3,852,083 A | 12/1974 | Yang |
| 3,870,538 A | 3/1975 | Burkard et al. |
| 3,890,305 A | 6/1975 | Weber et al. |
| 3,926,870 A | 12/1975 | Keegan et al. |
| 3,930,872 A | 1/1976 | Toeniskoetter et al. |
| 3,932,923 A | 1/1976 | DiMatteo |
| 4,041,476 A | 8/1977 | Swainson |
| 4,042,408 A | 8/1977 | Murray et al. |
| 4,078,229 A | 3/1978 | Swanson et al. |
| 4,247,508 A | 1/1981 | Housholder |
| 4,288,861 A | 9/1981 | Swanson et al. |
| 4,303,556 A | 12/1981 | Llendado |
| 4,310,996 A | 1/1982 | Mulvey et al. |
| 4,327,156 A | 4/1982 | Dillon et al. |
| 4,369,025 A | 1/1983 | von der Weid et al. |

(Continued)

FOREIGN PATENT DOCUMENTS

CN       1810492       8/2006

(Continued)

OTHER PUBLICATIONS

US 4,937,420, filed Jun. 26, 1990, Deckard (withdrawn).

(Continued)

*Primary Examiner* — James J Seidleck
*Assistant Examiner* — Vu A Nguyen

(57) ABSTRACT

A materials system and methods are provided to enable the formation of articles by Three Dimensional Printing. The materials system includes a transition metal catalyst that facilitates the reaction of an acrylate-containing binder with a particulate material.

7 Claims, 22 Drawing Sheets

U.S. PATENT DOCUMENTS

| | | |
|---|---|---|
| 4,443,392 A | 4/1984 | Becker et al. |
| 4,444,594 A | 4/1984 | Paddison et al. |
| 4,476,190 A | 10/1984 | Clarke et al. |
| 4,575,330 A | 3/1986 | Hull |
| 4,613,627 A | 9/1986 | Sherman et al. |
| 4,618,390 A | 10/1986 | Powell |
| 4,649,077 A | 3/1987 | Lauchenauer et al. |
| 4,665,492 A | 5/1987 | Masters |
| 4,752,352 A | 6/1988 | Feygin |
| 4,752,498 A | 6/1988 | Fudim |
| 4,755,227 A | 7/1988 | Sherif et al. |
| 4,758,278 A | 7/1988 | Tomic |
| 4,801,477 A | 1/1989 | Fudim |
| 4,844,144 A | 7/1989 | Murphy et al. |
| 4,863,538 A | 9/1989 | Deckard |
| 4,929,402 A | 5/1990 | Hull |
| 4,938,816 A | 7/1990 | Beaman et al. |
| 4,940,412 A | 7/1990 | Blumenthal et al. |
| 4,942,001 A | 7/1990 | Murphy et al. |
| 4,942,003 A | 7/1990 | Bold et al. |
| 4,942,060 A | 7/1990 | Grossa et al. |
| 4,943,928 A | 7/1990 | Campbell et al. |
| 4,944,817 A | 7/1990 | Bourell et al. |
| 4,945,032 A | 7/1990 | Murphy et al. |
| 4,961,154 A | 10/1990 | Pomerantz et al. |
| 4,996,010 A | 2/1991 | Modrek |
| 4,996,282 A | 2/1991 | Noren et al. |
| 4,999,143 A | 3/1991 | Hull et al. |
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman et al. |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,491 A | 3/1992 | Nagai et al. |
| 5,096,530 A | 3/1992 | Cohen |
| 5,104,592 A | 4/1992 | Hull et al. |
| 5,106,288 A | 4/1992 | Hughes et al. |
| 5,107,395 A | 4/1992 | Kawakami et al. |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur et al. |
| 5,158,858 A | 10/1992 | Lawton et al. |
| 5,164,882 A | 11/1992 | Kanai et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa et al. |
| 5,176,188 A | 1/1993 | Quinn et al. |
| 5,182,055 A | 1/1993 | Allison et al. |
| 5,182,056 A | 1/1993 | Spence et al. |
| 5,182,134 A | 1/1993 | Sato |
| 5,182,715 A | 1/1993 | Vorgitch et al. |
| 5,183,598 A | 2/1993 | Helle et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A | 4/1993 | Sachs et al. |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky et al. |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,581 A | 12/1993 | Koslowski et al. |
| 5,273,691 A | 12/1993 | Hull et al. |
| 5,275,916 A | 1/1994 | Kato et al. |
| 5,278,442 A | 1/1994 | Prinz et al. |
| 5,279,665 A | 1/1994 | Yunovich et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur et al. |
| 5,296,062 A | 3/1994 | Bourell et al. |
| 5,296,335 A | 3/1994 | Thomas et al. |
| 5,301,415 A | 4/1994 | Prinz et al. |
| 5,303,141 A | 4/1994 | Batchelder et al. |
| 5,306,446 A | 4/1994 | Howe |
| 5,306,447 A | 4/1994 | Marcus et al. |
| 5,316,580 A | 5/1994 | Deckard |
| 5,328,539 A | 7/1994 | Sato |
| 5,338,611 A | 8/1994 | Lause et al. |
| 5,340,433 A | 8/1994 | Crump |
| 5,340,656 A | 8/1994 | Sachs et al. |
| 5,342,566 A | 8/1994 | Schafer et al. |
| 5,342,919 A | 8/1994 | Dickens, Jr. et al. |
| 5,344,298 A | 9/1994 | Hull |
| 5,345,391 A | 9/1994 | Hull et al. |
| 5,345,414 A | 9/1994 | Nakamura et al. |
| 5,348,693 A | 9/1994 | Taylor et al. |
| 5,352,310 A | 10/1994 | Natter |
| 5,352,405 A | 10/1994 | Beaman et al. |
| 5,355,318 A | 10/1994 | Dionnet et al. |
| 5,358,673 A | 10/1994 | Heller et al. |
| 5,364,889 A | 11/1994 | Quinn et al. |
| 5,365,996 A | 11/1994 | Crook |
| 5,370,692 A | 12/1994 | Fink et al. |
| 5,376,320 A | 12/1994 | Tiefenbacher et al. |
| 5,382,289 A | 1/1995 | Bambauer et al. |

| | | |
|---|---|---|
| 5,382,308 A | 1/1995 | Bourell et al. |
| 5,385,772 A | 1/1995 | Slovinsky et al. |
| 5,386,500 A | 1/1995 | Pomerantz et al. |
| 5,387,380 A | 2/1995 | Cima et al. |
| 5,391,072 A | 2/1995 | Lawton et al. |
| 5,391,460 A | 2/1995 | Dougherty et al. |
| 5,393,613 A | 2/1995 | MacKay |
| 5,402,351 A | 3/1995 | Batchelder et al. |
| 5,415,820 A | 5/1995 | Furuta et al. |
| 5,418,112 A | 5/1995 | Mirle et al. |
| 5,426,722 A | 6/1995 | Batchelder |
| 5,429,788 A | 7/1995 | Ribble et al. |
| 5,429,908 A | 7/1995 | Hokuf et al. |
| 5,430,666 A | 7/1995 | DeAngelis et al. |
| 5,432,045 A | 7/1995 | Narukawa et al. |
| 5,433,280 A | 7/1995 | Smith |
| 5,435,902 A | 7/1995 | Andre, Sr. |
| 5,437,964 A | 8/1995 | Lapin et al. |
| 5,439,622 A | 8/1995 | Pennisi et al. |
| 5,447,822 A | 9/1995 | Hull et al. |
| 5,450,205 A | 9/1995 | Sawin et al. |
| 5,458,825 A | 10/1995 | Grolman et al. |
| 5,460,758 A | 10/1995 | Langer et al. |
| 5,461,088 A | 10/1995 | Wolf et al. |
| 5,468,886 A | 11/1995 | Steinmann et al. |
| 5,470,689 A | 11/1995 | Wolf et al. |
| 5,474,719 A | 12/1995 | Fan et al. |
| 5,482,659 A | 1/1996 | Sauerhoefer |
| 5,490,882 A | 2/1996 | Sachs et al. |
| 5,490,962 A | 2/1996 | Cima et al. |
| 5,491,643 A | 2/1996 | Batchelder |
| 5,494,618 A | 2/1996 | Sitzmann et al. |
| 5,495,029 A | 2/1996 | Steinmann et al. |
| 5,495,328 A | 2/1996 | Spence et al. |
| 5,498,782 A | 3/1996 | Rex |
| 5,500,069 A | 3/1996 | Ogue et al. |
| 5,501,824 A | 3/1996 | Almquist et al. |
| 5,503,785 A | 4/1996 | Crump et al. |
| 5,503,793 A | 4/1996 | Uchinono et al. |
| 5,506,046 A | 4/1996 | Andersen et al. |
| 5,506,087 A | 4/1996 | Lapin et al. |
| 5,506,607 A | 4/1996 | Sanders, Jr. et al. |
| 5,507,336 A | 4/1996 | Tobin |
| 5,510,226 A | 4/1996 | Lapin et al. |
| 5,512,162 A | 4/1996 | Sachs et al. |
| 5,514,232 A | 5/1996 | Burns |
| 5,514,378 A | 5/1996 | Mikos et al. |
| 5,518,680 A | 5/1996 | Cima et al. |
| 5,519,816 A | 5/1996 | Pomerantz et al. |
| 5,525,051 A | 6/1996 | Takano et al. |
| 5,527,877 A | 6/1996 | Dickens, Jr. et al. |
| 5,534,059 A | 7/1996 | Immordino, Jr. |
| 5,534,104 A | 7/1996 | Langer et al. |
| 5,536,467 A | 7/1996 | Reichle et al. |
| 5,545,367 A | 8/1996 | Bae et al. |
| 5,554,336 A | 9/1996 | Hull |
| 5,555,176 A | 9/1996 | Menhennett et al. |
| 5,555,481 A | 9/1996 | Rock et al. |
| 5,556,590 A | 9/1996 | Hull |
| 5,569,349 A | 10/1996 | Almquist et al. |
| 5,569,431 A | 10/1996 | Hull |
| 5,571,471 A | 11/1996 | Hull |
| 5,572,431 A | 11/1996 | Brown et al. |
| 5,573,721 A | 11/1996 | Gillette |
| 5,573,722 A | 11/1996 | Hull |
| 5,573,889 A | 11/1996 | Hofmann et al. |
| 5,582,876 A | 12/1996 | Langer et al. |
| 5,587,913 A | 12/1996 | Abrams et al. |
| 5,591,563 A | 1/1997 | Suzuki et al. |
| 5,593,531 A | 1/1997 | Penn |
| 5,594,652 A | 1/1997 | Penn et al. |
| 5,595,597 A | 1/1997 | Fogel et al. |
| 5,595,703 A | 1/1997 | Swaelens et al. |
| 5,596,504 A | 1/1997 | Tata et al. |
| 5,597,520 A | 1/1997 | Smalley et al. |
| 5,597,589 A | 1/1997 | Deckard |
| 5,598,340 A | 1/1997 | Medard et al. |
| 5,599,651 A | 2/1997 | Steinmann et al. |
| 5,603,797 A | 2/1997 | Thomas et al. |
| 5,605,941 A | 2/1997 | Steinmann et al. |
| 5,608,814 A | 3/1997 | Gilmore et al. |
| 5,609,812 A | 3/1997 | Childers et al. |
| 5,609,813 A | 3/1997 | Allison et al. |
| 5,610,824 A | 3/1997 | Vinson et al. |
| 5,611,883 A | 3/1997 | Tompkins et al. |
| 5,614,075 A | 3/1997 | Andre, Sr. |
| 5,616,293 A | 4/1997 | Ashtiani-Zarandi et al. |
| 5,616,294 A | 4/1997 | Deckard |
| 5,622,577 A | 4/1997 | O'Connor |
| 5,622,811 A | 4/1997 | Ogue et al. |
| 5,626,919 A | 5/1997 | Chapman et al. |
| 5,630,981 A | 5/1997 | Hull |
| 5,632,848 A | 5/1997 | Richards et al. |
| 5,633,021 A | 5/1997 | Brown et al. |
| 5,637,169 A | 6/1997 | Hull et al. |
| 5,637,175 A | 6/1997 | Feygin et al. |
| 5,639,070 A | 6/1997 | Deckard |
| 5,639,402 A | 6/1997 | Barlow et al. |
| 5,639,413 A | 6/1997 | Crivello |
| 5,640,667 A | 6/1997 | Freitag et al. |
| 5,641,448 A | 6/1997 | Yeung et al. |
| 5,645,973 A | 7/1997 | Hofmann et al. |
| 5,648,450 A | 7/1997 | Dickens, Jr. et al. |
| 5,649,277 A | 7/1997 | Greul et al. |
| 5,650,260 A | 7/1997 | Onishi et al. |
| 5,651,934 A | 7/1997 | Almquist et al. |
| 5,653,925 A | 8/1997 | Batchelder |
| 5,656,230 A | 8/1997 | Khoshevis |
| 5,658,412 A | 8/1997 | Retallick et al. |
| 5,658,712 A | 8/1997 | Steinmann et al. |
| 5,659,478 A | 8/1997 | Pennisi et al. |
| 5,660,621 A | 8/1997 | Bredt |
| 5,660,900 A | 8/1997 | Andersen et al. |
| 5,663,883 A | 9/1997 | Thomas et al. |
| 5,665,401 A | 9/1997 | Serbin et al. |
| 5,667,820 A | 9/1997 | Heller et al. |
| 5,672,312 A | 9/1997 | Almquist et al. |
| 5,674,921 A | 10/1997 | Regula et al. |
| 5,676,904 A | 10/1997 | Almquist et al. |
| 5,677,107 A | 10/1997 | Neckers |
| 5,684,713 A | 11/1997 | Asada et al. |
| 5,688,464 A | 11/1997 | Jacobs et al. |
| 5,693,144 A | 12/1997 | Jacobs et al. |
| 5,695,707 A | 12/1997 | Almquist et al. |
| 5,697,043 A | 12/1997 | Baskaran et al. |
| 5,698,485 A | 12/1997 | Bruck et al. |
| 5,700,406 A | 12/1997 | Menhennett et al. |
| 5,703,138 A | 12/1997 | Cantor et al. |
| 5,705,116 A | 1/1998 | Sitzmann et al. |
| 5,705,117 A | 1/1998 | O'Connor et al. |
| 5,705,316 A | 1/1998 | Steinmann et al. |
| 5,707,578 A | 1/1998 | Johnson et al. |
| 5,707,780 A | 1/1998 | Lawton et al. |
| 5,711,911 A | 1/1998 | Hull |
| 5,713,410 A | 2/1998 | LaSalle et al. |
| 5,717,599 A | 2/1998 | Menhennett et al. |
| 5,718,279 A | 2/1998 | Satoh et al. |
| 5,718,757 A | 2/1998 | Guillou et al. |
| 5,727,138 A | 3/1998 | Harada et al. |
| 5,728,345 A | 3/1998 | Hlavaty et al. |
| 5,730,817 A | 3/1998 | Feygin et al. |
| 5,730,925 A | 3/1998 | Mattes et al. |
| 5,731,388 A | 3/1998 | Suzuki et al. |
| 5,733,497 A | 3/1998 | McAlea et al. |
| 5,738,817 A | 4/1998 | Danforth et al. |
| 5,738,921 A | 4/1998 | Andersen et al. |
| 5,740,051 A | 4/1998 | Sanders, Jr. et al. |
| 5,746,844 A | 5/1998 | Sterett et al. |
| 5,746,967 A | 5/1998 | Hoy et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,772,947 A | 6/1998 | Hull et al. |
| 5,783,358 A | 7/1998 | Schulthess et al. |
| 5,800,756 A | 9/1998 | Andersen et al. |
| 5,805,971 A | 9/1998 | Akedo et al. |
| 5,851,465 A | 12/1998 | Bredt |
| 5,870,307 A | 2/1999 | Hull et al. |

| | | |
|---|---|---|
| 5,902,441 A | 5/1999 | Bredt et al. |
| 5,902,537 A | 5/1999 | Almquist et al. |
| 5,940,674 A | 8/1999 | Sachs et al. |
| 5,943,235 A | 8/1999 | Earl et al. |
| 5,948,874 A | 9/1999 | Pike et al. |
| 5,965,776 A | 10/1999 | Leppard et al. |
| 5,976,339 A | 11/1999 | Andre, Sr. |
| 6,007,318 A | 12/1999 | Russell et al. |
| 6,071,675 A | 6/2000 | Teng |
| 6,077,887 A | 6/2000 | Thuresson et al. |
| 6,112,109 A | 8/2000 | D'Urso et al. |
| 6,136,088 A | 10/2000 | Farrington |
| 6,136,948 A | 10/2000 | Dickens, Jr. et al. |
| 6,147,138 A | 11/2000 | Hochsmann et al. |
| 6,193,922 B1 | 2/2001 | Ederer et al. |
| 6,243,616 B1 | 6/2001 | Droscher et al. |
| 6,299,677 B1 | 10/2001 | Johnson et al. |
| 6,348,679 B1 | 2/2002 | Ryan et al. |
| 6,363,606 B1 | 4/2002 | Johnson et al. |
| 6,375,874 B1 | 4/2002 | Russell et al. |
| 6,378,974 B1 | 4/2002 | Oelbrandt et al. |
| 6,397,922 B1 | 6/2002 | Sachs et al. |
| 6,401,001 B1 | 6/2002 | Jang et al. |
| 6,403,002 B1 | 6/2002 | van der Geest et al. |
| 6,416,850 B1 | 7/2002 | Bredt et al. |
| 6,423,255 B1 | 7/2002 | Hoechsmann et al. |
| 6,433,038 B1 | 8/2002 | Tanabe et al. |
| 6,531,086 B1 | 3/2003 | Larsson et al. |
| 6,540,784 B2 | 4/2003 | Barlow et al. |
| 6,600,142 B2 | 7/2003 | Ryan et al. |
| 6,610,429 B2 | 8/2003 | Bredt et al. |
| 6,713,125 B1 | 3/2004 | Sherwood et al. |
| 6,740,423 B2 | 5/2004 | Murase |
| 6,742,456 B1 | 6/2004 | Kasperchik et al. |
| 6,780,368 B2 | 8/2004 | Liu et al. |
| 6,799,959 B1 | 10/2004 | Tochimoto et al. |
| 6,884,311 B1 | 4/2005 | Dalvey et al. |
| 6,930,144 B2 | 8/2005 | Oriakhi |
| 6,989,115 B2 | 1/2006 | Russell et al. |
| 7,037,382 B2 | 5/2006 | Davidson et al. |
| 7,049,363 B2 | 5/2006 | Shen et al. |
| 7,087,109 B2 | 8/2006 | Bredt et al. |
| 7,120,512 B2 | 10/2006 | Kramer et al. |
| 7,285,234 B2 | 10/2007 | Pfeifer et al. |
| 7,300,613 B2 | 11/2007 | Sano et al. |
| 7,332,537 B2 | 2/2008 | Bredt et al. |
| 7,674,423 B2 | 3/2010 | Sano |
| 2001/0014402 A1 | 8/2001 | Murase |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0106412 A1 | 8/2002 | Rowe et al. |
| 2003/0054218 A1 | 3/2003 | Hampden-Smith et al. |
| 2003/0090034 A1 | 5/2003 | Mulhaupt et al. |
| 2003/0143268 A1 | 7/2003 | Pryce Lewis et al. |
| 2003/0173695 A1 | 9/2003 | Monkhouse et al. |
| 2004/0038009 A1 | 2/2004 | Leyden et al. |
| 2004/0056378 A1 | 3/2004 | Bredt et al. |
| 2004/0062814 A1 | 4/2004 | Rowe et al. |
| 2004/0166187 A1 | 8/2004 | Fong |
| 2004/0173946 A1 | 9/2004 | Pfeifer et al. |
| 2004/0232583 A1 | 11/2004 | Monsheimer et al. |
| 2005/0001356 A1 | 1/2005 | Tochimoto et al. |
| 2005/0003189 A1 | 1/2005 | Bredt et al. |
| 2005/0017394 A1 | 1/2005 | Hochsmann et al. |
| 2005/0059757 A1 | 3/2005 | Bredt et al. |
| 2005/0080191 A1 | 4/2005 | Kramer et al. |
| 2005/0093194 A1 | 5/2005 | Oriakhi et al. |
| 2005/0104241 A1 | 5/2005 | Kritchman et al. |
| 2005/0110177 A1 | 5/2005 | Schulman et al. |
| 2005/0179167 A1 | 8/2005 | Hachikian |
| 2005/0197431 A1 | 9/2005 | Bredt et al. |
| 2005/0212163 A1 | 9/2005 | Bausinger et al. |
| 2005/0230870 A1 | 10/2005 | Oriakhi |
| 2006/0071367 A1 | 4/2006 | Hunter et al. |
| 2006/0141145 A1 | 6/2006 | Davidson et al. |
| 2006/0208388 A1 | 9/2006 | Bredt et al. |
| 2006/0230984 A1 | 10/2006 | Bredt et al. |
| 2007/0007698 A1 | 1/2007 | Sano |
| 2007/0029698 A1 | 2/2007 | Rynerson et al. |
| 2007/0135531 A1 | 6/2007 | Norcini et al. |
| 2007/0241482 A1 | 10/2007 | Giller et al. |
| 2008/0138515 A1 | 6/2008 | Williams |
| 2008/0187711 A1 | 8/2008 | Alam et al. |
| 2008/0281019 A1 | 11/2008 | Giller et al. |
| 2011/0156301 A1 | 6/2011 | Giller et al. |

FOREIGN PATENT DOCUMENTS

| | | |
|---|---|---|
| CN | 1857930 | 11/2006 |
| DE | 3048506 A1 | 7/1982 |
| DE | 4012044 | 10/1991 |
| DE | 19727677 | 1/1999 |
| DE | 19853834 | 5/2000 |
| DE | 10158233 | 3/2003 |
| EP | 0431924 | 6/1991 |
| EP | 0540203 | 5/1993 |
| EP | 1226019 B1 | 7/2002 |
| EP | 1 475 221 A | 11/2004 |
| EP | 1 491 517 A | 12/2004 |
| EP | 1 498 277 A | 1/2005 |
| EP | 1 512 519 A | 3/2005 |
| EP | 1 623 816 | 2/2006 |
| EP | 1 623 816 A | 2/2006 |
| GB | 2048235 A | 12/1980 |
| GB | 2155944 A | 10/1985 |
| JP | 56-096762 A | 8/1981 |
| JP | 62260754 A | 11/1987 |
| JP | 02-307730 A | 12/1990 |
| JP | 3287683 | 12/1991 |
| JP | 5025898 A | 2/1993 |
| JP | 06289612 | 10/1994 |
| JP | 08-192468 A | 7/1996 |
| JP | 9241311 | 9/1997 |
| JP | 10-182904 A | 7/1998 |
| JP | 11116875 | 4/1999 |
| JP | 2001-015613 A | 1/2001 |
| JP | 2001162351 | 6/2001 |
| WO | WO-9319019 | 9/1993 |
| WO | WO-93/20112 A1 | 10/1993 |
| WO | WO-9325336 | 12/1993 |
| WO | WO-9412328 | 6/1994 |
| WO | WO-94/20274 A1 | 9/1994 |
| WO | WO-9530503 | 11/1995 |
| WO | WO-9606881 | 3/1996 |
| WO | WO-9711835 | 4/1997 |
| WO | WO-9726302 | 7/1997 |
| WO | WO-97/032671 | 9/1997 |
| WO | WO-98/09798 A1 | 3/1998 |
| WO | WO-9809798 A1 | 3/1998 |
| WO | WO-9828124 | 7/1998 |
| WO | WO-01/34371 | 5/2001 |
| WO | WO-01/78969 A2 | 10/2001 |
| WO | WO-02/38677 | 5/2002 |
| WO | WO-02-064354 A1 | 8/2002 |
| WO | WO-03-016030 | 2/2003 |
| WO | WO-2004/048463 | 6/2004 |
| WO | WO-2004-062927 A1 | 7/2004 |
| WO | WO-2004-096514 A2 | 11/2004 |
| WO | WO-2005/011959 | 2/2005 |
| WO | WO-2005-023524 A2 | 3/2005 |
| WO | WO-2005-025074 | 3/2005 |
| WO | WO-2005090055 | 9/2005 |
| WO | WO-2005105412 | 11/2005 |
| WO | WO-2007-039450 A1 | 4/2007 |
| WO | WO-2007/147625 | 12/2007 |

OTHER PUBLICATIONS

Adamson, *Physical Chemistry of Surfaces*, Interscience Publishers, Inc. (1967).

Aranson et al., *The Physics of Granular Media*, H. Hinrichsen & D. Wolf, eds, Wiley-VCH, (2004) pp. 146-147.

Borland, "Characterization of Fundamental and Reticulated Biomedical Polymer Structures Fabricated by Three Dimensional Printing," Thesis, MIT, Jun. 1995.

Boyer et al., eds., "Metals Handbook," American Society for Metals, pp. 23.5, 23.8-23.13, (1985).

Brandup et al., Polymer Handbook, pp. 675-714, John Wiley & Sons (1999).
Das, *Advanced Soil Mechanics*, Hemisphere Pr., (1997) pp. 313-326.
Das, B.M. *Advanced Soil Mechanics*, Hemisphere Pr., pp. 313-326 (1997).
Definition of "Colorant," Hawley's Condensed Chemical Dictionary, 14th Ed. (2001) p. 287.
Ederer, "A 3D Print Process for Inexpensive Plastic Parts," Presentation for the Austin Solid Freeform Conference, 1995.
European Search Report for 03029489.6, Feb. 16, 2004, 3 pgs.
European Search Report for European Application No. 04 00 1558, Apr. 27, 2006, 5 pgs.
Examination report for European patent Application No. 01 927 008.1, mailed Jan. 23, 2008, 7 pages.
Examination report for European patent Application No. 01 927 008.1, mailed May 11, 2009 (3 pages).
Examination report for European patent Application No. 03759353.0, dated Jun. 21, 2007, 3 pages.
Examination report for European patent Application No. 03759353.0, dated Mar. 25, 2008, 7 pages.
Examination report for European patent Application No. 03759353.0, dated Nov. 21, 2008, 4 pages.
Examination report for European patent Application No. 03759353.0, dated Oct. 27, 2005, 5 pages.
Examination report for European patent Application No. 04 752 633.0, mailed Apr. 22, 2009 (3 pages).
Examination report for European patent Application No. 05024830.1, mailed Jan. 23, 2009, 8 pages.
Examination report for European patent Application No. 05024830.1, mailed Mar. 5, 2010 (4 pages).
Examination report for European patent Application No. 00 976 896.1-2307, Jan. 28, 2003 (5 pages).
Examination report in Canadian Patent Application No. 2,338,617, mailed Aug. 17, 2007 (2 pages).
German, Powder Injection Molding, (1990), pp. 32-43 and 92-95.
Grant, Julius, Editor, "Hackh's Chemical Dictionary" Fourth Edition (1972, McGraw-Hill Book Company, New York), p. 250, "ethyl acetate."
Hamill, Search Report dated Jan. 30, 2008, 2 pages.
Hamill, Search Report dated Jan. 4, 2008, 3 pages.
http://toxics.usgs.gov/definitions/kow.html, printed Jun. 24, 2008.
http://www.cibasc.com/brightening.htm, printed Jun. 24, 2008.
http://www.devicelink.com/mddi/archive/99/09/006.html, printed Jun. 24, 2008.
International Preliminary Examination Report for Int'l Application No. PCT/US01/12220, Mar. 14, 2003.
International Preliminary Examination Report for PCT/US97/15041, Oct. 19, 1998, 9 pgs.
International Preliminary Report on Patentability for Intl. Application No. PCT/US2004/027549 (Dec. 6, 2007).
International Preliminary Report on Patentability for Intl. Application No. PCT/US2007/025075, mailed Jun. 18, 2009 (9 pages).
International Preliminary Report on Patentability for Intl. Application No. PCT/US2008/000366, mailed Jul. 23, 2009 (12 pages).
International Preliminary Report on Patentability for Intl. Application No. PCT/US2008/002362, mailed Sep. 3, 2009 (10 pages).
International Preliminary Report on Patentability for PCT/US2007/008046, mailed Oct. 8, 2008 (14 pages).
International Preliminary Report on Patentability, Application No. PCT/US2004/015644, Nov. 25, 2005, 6 pgs.
International Search Report & Written Opinion for PCT/US2007/008046, Nov. 15, 2007, 23 pages.
International Search Report & Written Opinion for PCT/US2008/000366, mailed Jun. 20, 2008.
International Search Report and Written Opinion for PCT/US2004/027549.
International Search Report and Written Opinion for PCT/US2007/025075, mailed Jun. 12, 2008.
International Search Report and Written Opinion for PCT/US2008/002362, mailed Nov. 11, 2008 (16 pages).
International Search Report for PCT/US03/29714, Feb. 10, 2004, 4 pgs.
International Search Report for PCT/US97/15041, Jan. 12, 1998, 4 pgs.
International Search Report for PCT/US99/20628, Jan. 21, 2000, 3 pgs.
International Search Report of Int'l Application No. PCT/US01/12220, Apr. 15, 2002.
International search Report of Int'l Application No. PCT/US04/015644, Oct. 24, 2005.
Invitation to Pay Additional Fees & Partial ISR for PCT/US2007/008046, Sep. 18, 2007 (6 pages).
Khanuja, "Origin and Control of Anisotropy in Three Dimensional Printing of Structural Ceramics," Thesis, MIT, Feb. 1996.
Knapczyk, "Polyallyl Glycidyl Ether Resins for Very Fast Curing High Performance Coatings", 65th Annual Meeting of the Federation of Societies for Coating Technology, Dallas, TX (Oct. 1987) pp. 761-773.
Office Action in European Patent Application No. 01927008.1, mailed Oct. 1, 2009, 4 pages.
Office Action in European Patent Application No. 04001558.8, mailed Jun. 10, 2010, 5 pages.
Office Action in European Patent Application No. 04001558.8, mailed Oct. 2, 2009, 3 pages.
Office Action in European Patent Application No. 04752633.0, mailed Jun. 11, 2010, 4 pages.
Office Action in Japanese Patent Application No. 2000-579442, mailed May 11, 2010, 2 pages (translation).
Office Action in Japanese Patent Application No. 2000-579442, mailed Sep. 8, 2009, 3 pages (translation).
Office Action in Japanese Patent Application No. 2001-536349, mailed Jun. 1, 2010, 3 pages (translation).
Office Action in Japanese Patent Application No. 2004-540142, mailed Feb. 16, 2010, 6 pages (translation).
Office Action in Japanese Patent Application No. 2006-533208, mailed Nov. 10, 2009, 4 pages (translation).
Office Action in Japanese Patent Application No. 549079/98, mailed Mar. 24, 2009, 2 pages (translation).
Office Action in Japanese Patent Application No. 549079/98, mailed Nov. 27, 2007, 3 pages.
Office Action in the The People's Republic of China, Application No. 200480018360, Oct. 13, 2006, 5pgs.
Official Action from Canadian Intellectual Property Office for Canadian Application Ser. No. 2,388,046, dated Apr. 10, 2006.
Pizzi et al., *Handbook of Adhesive Technology*, Marcel Dekker, Inc. (2003) pp. 761-773.
Rulison, "Wettability Studies for Porous Solids Including Powders and Fibrous Materials—Technical Notice #302" (1996).
Written Opinion for PCT/US99/20628, Jul. 27, 2000, 10 pgs.
Examination report for European patent Application No. 05024830.1, mailed Jan. 27, 2011 (5 pages).
Office Action in Japanese Patent Application No. 2000-579442, mailed Jul. 19, 2011, 10 pages (with translation).
Office Action in Japanese Patent Application No. 2001-576254, Mar. 22, 2011, 6 pages.
Office Action in Korean Patent Application No. 10-2011-7007842, Jul. 8, 2011, 6 pages.
Office Action in Chinese Patent Application No. 200880005474.8, mailed Aug. 16, 2011, 9 pages.
Office Action in Japanese Patent Application No. 2001-576254, Jul. 19, 2011, 3 pages.
Office Action in Japanese Patent Application No. 2001-576254, issued Oct. 25, 2011, 19 pages.
Office Action in Chinese Application No. 200780048035.0, mailed Sep. 23, 2011, 12 pages.

THREE DIMENSIONAL PRINTING MATERIAL SYSTEM AND METHOD USING PEROXIDE CURE

RELATED APPLICATION

This application is a divisional of U.S. non-provisional application Ser. No. 11/952,727, filed Dec. 7, 2007, which claims priority to U.S. Provisional Patent Application Ser. No. 60/873,730, filed Dec. 8, 2006; the disclosures of both applications are hereby incorporated by reference in their entireties.

TECHNICAL FIELD

This invention relates generally to rapid prototyping techniques and, more particularly, to a three-dimensional printing material and method using a peroxide cure.

BACKGROUND

The field of rapid prototyping involves the production of prototype articles and small quantities of functional parts, as well as structural ceramics and ceramic shell molds for metal casting, directly from computer-generated design data.

Two well-known methods for rapid prototyping include a selective laser sintering process and a liquid binder Three Dimensional Printing process. These techniques are similar, to the extent that they both use layering techniques to build three-dimensional articles. Both methods form successive thin cross-sections of the desired article. The individual cross-sections are formed by bonding together adjacent grains of a granular, (i.e., particulate) material on a generally planar surface of a bed of the granular material. Each layer is bonded to a previously formed layer at the same time as the grains of each layer are bonded together to form the desired three-dimensional article. The laser-sintering and liquid binder techniques are advantageous because they create parts directly from computer-generated design data and can produce parts having complex geometries. Moreover, Three Dimensional Printing may be quicker and less expensive than machining of prototype parts or production of cast or molded parts by conventional "hard" or "soft" tooling techniques that can take from a few weeks to several months, depending on the complexity of the item.

An early Three Dimensional Printing technique, described in U.S. Pat. No. 5,204,055, incorporated herein by reference in its entirety, describes the use of an ink-jet style printing head to deliver a liquid or colloidal binder material to sequentially applied layers of powdered material. The three-dimensional ink-jet printing technique or liquid binder method involves applying a layer of a powdered material to a surface using a counter-roller. After the powdered material is applied to the surface, the ink-jet printhead delivers a liquid binder in a predetermined pattern to the layer of powder. The binder infiltrates into gaps in the powder material and hardens to bond the powder material into a solidified layer. The hardened binder also bonds each layer to the previous layer. After the first cross-sectional portion is formed, the previous steps are repeated, building successive cross-sectional portions until the final article is formed. Optionally, an adhesive may be suspended in a carrier that evaporates, leaving the hardened adhesive behind. The powdered material may be ceramic, plastic or a composite material. The liquid binder material may be organic or inorganic. Typical organic binder materials used are polymeric resins or ceramic precursors, such as polycarbosilazane. Inorganic binders are used where the binder is incorporated into the final articles; silica is typically used in such an application.

Some groups, e.g., Fuji, have performed ultraviolet cure of acrylate binders over particulate material. Acrylate binders provide several advantages. First of all, they are curable by ultraviolet (UV) light, thereby enabling a faster forming process then is possible with other typical curing methods. Secondly, they allow the formation of articles having surfaces with plastic appearances, thereby enabling more realistic modeling of various objects. Finally, because acrylate binders are essentially solids, no evaporation takes place after the binders are printed, thereby allowing the formation of stable, tough structures.

The fast curing mechanism of UV initiation of (meth)acrylate polymerization may cause excessive distortion in free flowing particulate material, resulting in curling of the printed part, which may make the printing of parts having a thickness greater than 1 millimeter exceedingly difficult. To reduce curling due to fast curing, a first printed layer may be formed on a glass build plate, adhering thereto.

SUMMARY OF THE INVENTION

In an embodiment of the invention, strong parts may be made by Three Dimensional Printing over particulate material build material without a need for infiltration. Typical existing printing processes include a post-processing infiltration step to increase the strength of the printed article. Articles printed with the peroxide-containing binders described herein have strengths comparable to that of infiltrated articles, e.g., about 20 MPa, thereby eliminating a need for the infiltration step.

The fast curing mechanism of UV initiation of (meth)acrylate polymerization may cause curling and distortions to occur immediately from shrinkage due to the instantaneous decrease in free volume from the conversion of carbon-to-carbon double bonds of the individual (meth)acrylate monomer to single carbon-to-carbon bonds to another (meth)acrylate monomer. This may hinder the production of articles thicker than 1 mm from free-flowing particulate build materials, as articles tend to be destroyed in the process. The slower curing mechanism of the peroxide initiation according to the invention slows down the rate of carbon-to-carbon double bond conversion into single bonds and thus reduces the immediate curling and distortion. Moreover, the acrylate-containing binder cures upon contact with the particulate material, thus providing the advantage of a stable two-component product.

Both aerobic curing and anaerobic curing may be employed in embodiments of the invention. In contrast to existing processes where amines may be used as oxygen scavengers solely in ultraviolet curing, allyl ethers, as described herein, may be employed as oxygen scavengers in both ultraviolet curing and peroxide initiation.

In an embodiment, the invention features a powder material system for Three Dimensional Printing including a substantially dry particulate material that includes an insoluble filler, a soluble filler, and a transition metal catalyst. The dry particulate material is suitable for use in Three Dimensional Printing to form an article having a plurality of layers, the layers including a reaction product of the particulate material and a non-aqueous fluid that contacts the particulate material during Three Dimensional Printing.

One or more of the following features may be included. The particulate material may possess an internal angle of friction greater than 40° and less than 70°. The particulate material possess a critical surface tension greater than 20 dynes/cm. The particulate material may include about 50%-90% by weight of the insoluble filler, about 10-50% by weight of the soluble filler, and about 0.01-0.5% by weight of the transition metal catalyst.

The insoluble filler may include or consist essentially of solid glass microspheres, hollow glass microspheres, solid ceramic microspheres, hollow ceramic microspheres, potato starch, tabular alumina, calcium sulfate hemihydrate, calcium sulfate dihydrate, calcium carbonate, ultra-high molecular weight polyethylene, polyamide, poly-cyclic-olefins, polyurethane, polypropylene and combinations thereof.

The soluble filler may include or consist essentially of methyl methacrylate polymers, ethyl methacrylate polymers, butyl methacrylate polymers, polyvinylbutyral, and combinations thereof. The soluble filler may have a molecular weight between 100,000 g/mol and 500,000 g/mol.

The transition metal catalyst may include or consist essentially of cobalt (II) octoate, cobalt (II) naphthenate, vanadium (II) octoate, manganese naphthenate and combinations thereof.

The particulate material may include a pigment, e.g., about 0.5 to 5% by weight. The pigment may include or consist essentially of zinc oxide, zinc sulfide, barium sulfate, titanium dioxide, zirconium silicate, lead carbonate, and hollow borosilicate glass spheres.

The particulate material may include a processing aid, e.g., about 0.01-2.0% by weight of the processing aid. The processing aid may include or consist essentially of mineral oil, propylene glycol di(caprylate/caprate), petroleum jelly, propylene glycol, di-isobutyl phthalate, di-isononyl phthalate, polyalkyleneoxide modified heptamethyltrisiloxanes, polyalkyleneoxide modified polydimethylsiloxanes, secondary ethoxylated alcohols, fluorinated hydrocarbons, saturated hydrocarbon resin tackifiers, and combinations thereof.

In another aspect, the invention features a kit including a substantially dry particulate material including an insoluble filler, a soluble filler, and a transition metal catalyst. The kit also includes a fluid binder including a (meth)acrylate monomer, an allyl ether functional monomer and/or oligomer, and organic hydroperoxide.

One or more of the following features may be included. The fluid binder may have a contact angle of less than 25° on the particulate material. The fluid binder may include about 40%-95% by weight of the (meth)acrylate monomer, about 5-25% by weight of the allyl ether functional monomer/oligomer, and about 0.5-5% by weight of the organic hydroperoxide. The fluid binder may also include 0-1% by weight of surfactant. The fluid binder may include a (meth)acrylate oligomer, e.g., about 10-40% by weight of the (meth)acrylate oligomer. The fluid binder may include a first accelerator, e.g., up to about 2% by weight of the first accelerator. The first accelerator may include dimethylacetoacetamide.

A 1 mm penetration hardening rate of the substantially dry particulate material upon application of the fluid binder is selected from a range of 0.01/min to 1.0/min. The dry particulate material may include a pigment and/or a processing aid.

In yet another aspect, a method for forming an article by Three Dimensional Printing includes the step of providing a substantially dry particulate material including a plurality of adjacent particles, the particulate material comprising a transition metal catalyst. A fluid binder is applied to at least some of the plurality of particles in an amount sufficient to bond those particles together to define at least a portion of the article, the fluid binder including a (meth)acrylate monomer, a (meth)acrylate oligomer, an allyl ether functional monomer and/or oligomer, and organic hydroperoxide.

One or more of the following features may be included. The transition metal catalyst may induce decomposition of the organic hydroperoxide to generate free radicals and the free radicals initiate anaerobic polymerization of the (meth) acrylate monomer and oligomer, and aerobic polymerization of the allyl ether functional monomer/oligomer.

The fluid binder may include a first accelerator. The particulate material may include an insoluble filler, a soluble filler, a pigment, and/or a processing aid.

BRIEF DESCRIPTION OF THE FIGURES

The following drawings are not necessarily to scale, emphasis instead being placed generally upon illustrating the principles of the invention. The foregoing and other features and advantages of the present invention, as well as the invention itself, will be more fully understood from the following description of exemplary and preferred embodiments, when read together with the accompanying drawings, in which.

DETAILED DESCRIPTION

Three Dimensional Printing

Figure 1:
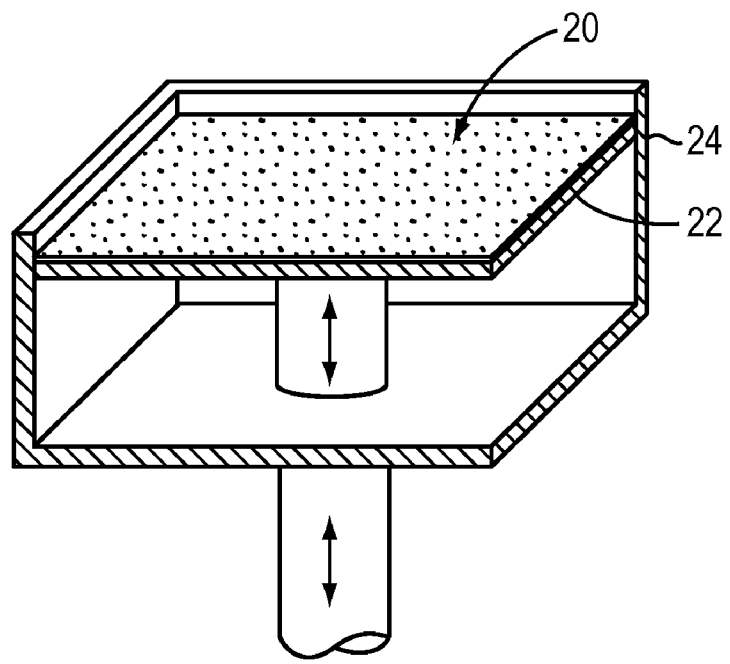
FIG. 1 is a schematic view of a first layer of a mixture of particulate material of an embodiment of the invention deposited onto a movable surface of a container on which an article is to be built, before any fluid has been delivered.

Referring to FIG. 1, in accordance with a printing method using the materials system of the present invention, a layer or film of a particulate material 20, i.e., an essentially dry, and free-flowing powder, is applied on a linearly movable surface 22 of a container 24. The layer or film of particulate material 20 may be formed in any suitable manner, for example using a counter-roller. The particulate material 20 applied to the surface includes an insoluble filler material, a soluble filler material, and a transition metal catalyst. The particulate material 20 may also include a pigment and/or a processing aid material.

Figure 2:
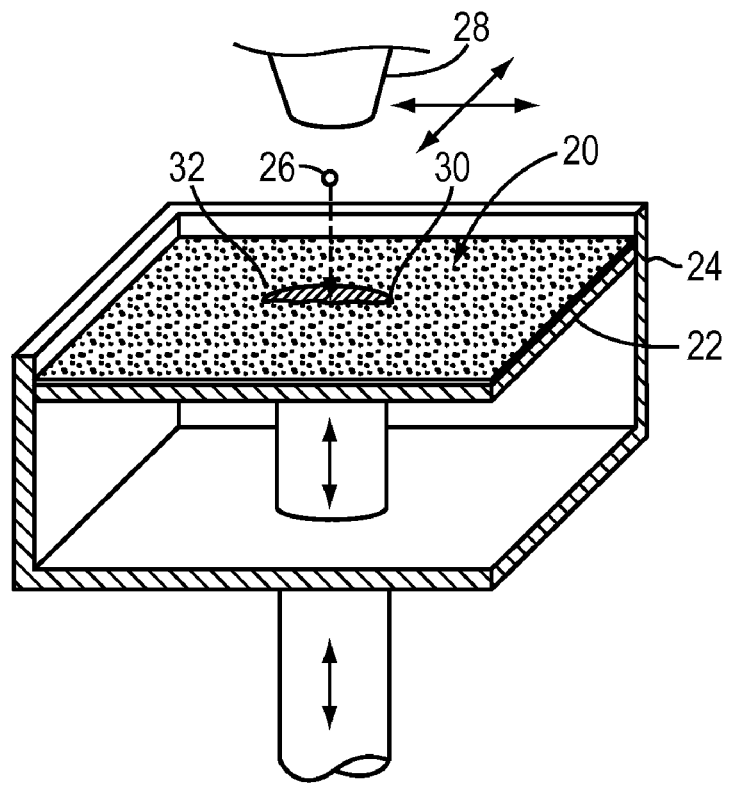
FIG. 2 is a schematic view of an ink-jet nozzle delivering a fluid to a portion of the layer of particulate material of FIG. 1 in a predetermined pattern.

Referring to FIG. 2, an ink-jet style nozzle 28 delivers a fluid binder 26 to at least a portion 30 of the layer or film of the particulate mixture 20 in a two-dimensional pattern. The fluid binder 26 delivered to the particulate material 20 includes a (meth)acrylate functional monomer, an allylic functional monomer/oligomer, and an organic hydroperoxide. The fluid binder 26 may also include a surfactant, an accelerator, and/or a (meth)acrylate functional oligomer. According to the printing method, the fluid binder 26 is delivered to the layer or film of particulate material 20 in any predetermined two-dimensional pattern (circular, in the figures, for purposes of illustration only), using any convenient mechanism, such as a drop-on-demand (DOD) printhead driven by software in accordance with article model data from a computer-assisted-design (CAD) system.

The first portion 30 of the particulate material activates the fluid binder 26, causing the fluid binder to initiate polymerization into a solid that adheres together the particulate mixture to form a conglomerate of the particulate material 20 (powder) and fluid binder 26. The conglomerate defines an essentially solid circular layer that becomes a cross-sectional portion of an intermediate article 38 (see, e.g., FIGS. 3 and 4). As used herein, "activates" is meant to define a change in state in the fluid binder 26 from essentially stable to reactive. This definition encompasses the decomposition of the organic hydroperoxide in the fluid binder 26 once in contact with the transition metal in the particulate material 20. When the fluid initially comes into contact with the particulate mixture, it immediately flows outwardly (on a microscopic scale) from the point of impact by capillary suction, dissolving the soluble filler within a time period, such as 30 seconds to one minute. A typical droplet of fluid binder has a volume of about 50 picoliters (pl), and spreads to a diameter of about 100 micrometer (μm) after coming into contact with the particulate mixture. As the fluid binder dissolves the soluble filler, the fluid viscosity increases dramatically, arresting further migration of the fluid from the initial point of impact. Within a few minutes, the fluid with soluble filler dissolved therein flows and adheres to the insoluble filler, forming adhesive bonds between the insoluble filler particulate material. The fluid binder is capable of bonding together an amount of the particulate mixture that is several times the mass of a droplet of the fluid. As the reactive monomers/oligomer of the fluid binder polymerize, the adhesive bonds harden, joining the insoluble filler particulate material and, optionally, pigment into a rigid structure, which becomes a cross-sectional portion of the final article 40.

Any dry particulate mixture 32 that was not exposed to the fluid remains loose and free-flowing on the movable surface 22. The dry particulate mixture is typically left in place until formation of the intermediate article 38 is complete. Leaving the dry, loose particulate mixture in place ensures that the intermediate article 38 is fully supported during processing, allowing features such as overhangs, undercuts, and cavities to be defined and formed without the need to use supplemental support structures. After formation of the first cross-sectional portion of the intermediate article 38, the movable surface 22 is indexed downwardly, in an embodiment, and the process is repeated.

Using, for example, a counter-rolling mechanism, a second film or layer of the particulate mixture is then applied over the first layer, covering both the rigid first cross-sectional portion, and any proximate loose particulate mixture. A second application of fluid binder follows in the manner described above, dissolving the soluble filler and forming adhesive bonds between at least a portion of the previous cross-sectional formed portion, the insoluble filler particulate material, and, optionally, pigment of the second layer, and hardening to form a second rigid cross-sectional portion added to the first rigid cross-sectional portion of the final article. The movable surface 22 is again indexed downward.

Figure 3:
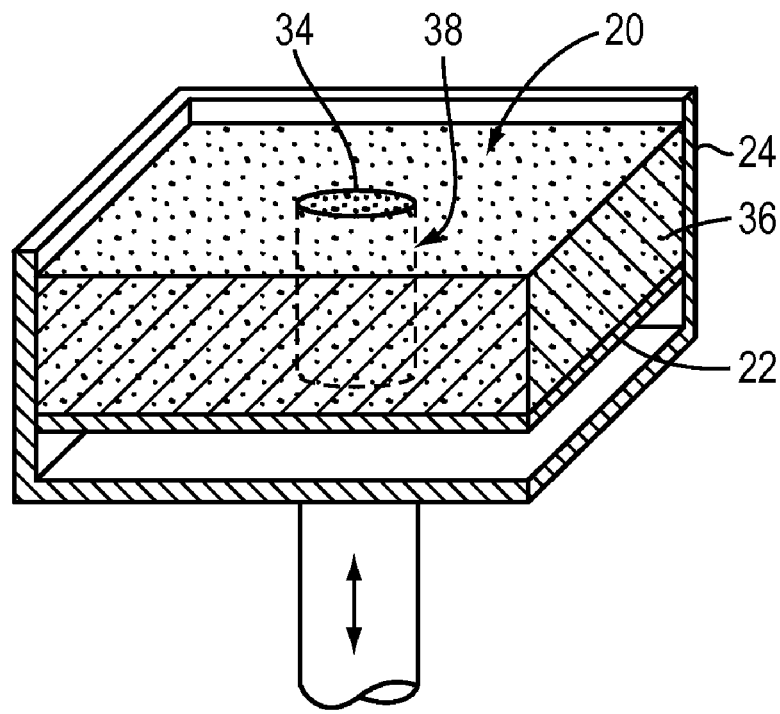
FIG. 3 is a schematic view of a final article of an embodiment of the invention enclosed in the container, the article made by a series of steps illustrated in FIG. 2 and embedded in the loose unactivated particles.

The previous steps of applying a layer of particulate mixture, including the soluble filler, applying the fluid binder, and indexing the movable surface 22 downward are repeated until the intermediate article 38 is completed. Referring to FIG. 3, the intermediate article 38 may be any shape, such as cylindrical. At the end of the process, only a top surface 34 of the intermediate article 38 is visible in the container 24. The intermediate article 38 is typically completely immersed in a surrounding bed 36 of dry and loose particulate material. Alternatively, an article could be formed in layers upward from an immovable platform, by successively depositing, smoothing, and printing a series of such layers.

Figure 4:
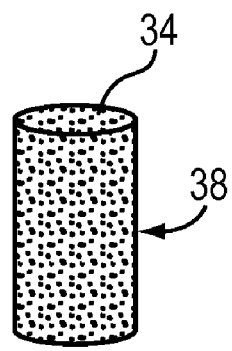
FIG. 4 is a schematic view of the final article of FIG. 3.

Referring to FIG. 4, the dry and loose particulate material may be removed from the intermediate article 38 by pressurized air flow or a vacuum. After removal of the dry and loose particulate material from the intermediate article 38, a post-processing treatment may be performed, such as heating in an oven, painting, etc. to define a final article 40, having the same shape as intermediate article 38, but with additional desired characteristics, such as a smooth surface appearance, neutral chroma, high lightness, toughness, strength, and flexibility.

Particulate Material

One preferred embodiment of a particulate material suitable for Three Dimensional Printing, i.e., a substantially dry particulate material, includes or consists essentially of:

| | |
|---|---|
| insoluble filler | 50-90 wt % |
| soluble filler | 10-50 wt % |
| pigment | 0.0-5 wt % |
| transition metal catalyst | 0.01-1 wt % |
| processing aids | 0.01-2.0 wt % |

A preferred particle size, i.e., diameter, of components of the particulate material is less than about 125 microns and greater than about 30 microns.

The insoluble filler provides dimensional stability and adhesion for strength of an article formed from the particulate material. One suitable insoluble filler for use with embodiments of the invention is glass microspheres. The glass microspheres may be made from borosilicate glass with an index of refraction of 1.5 and may be spherical with a particle size distribution ranging from greater than about 20 microns to less than about 125 microns, more preferably between 40 and 90 microns. The glass microspheres may be treated with an amino-silane so that the microsphere surface may have an amine functionality and provide better adhesion to a (meth) acrylate based binder. An example of such glass spheres is SPHERIGLASS 2530 CP03, available from PQ Corporation based in Valley Forge, Pa. This supplier also offers another glass microsphere product, T-4 SIGN BEADS, having an index of refraction of 1.9 that offers better light scattering to create a more neutral and lighter color than that of SPHERIGLASS 2530 CP03. Another suitable borosilicate glass bead product with an index of refraction of 1.5, but more translucent than Spheriglass 2530 CP03, is GL0179 from Mo-Sci Specialty products, LLC based in Rolla, Mo. The clearer product imparts a more neutral color to articles than both the SPHERIGLASS and T-4 SIGN BEAD products, which may be desirable for attaining a wider color gamut.

Various types of insoluble fillers suitable for use with embodiments of the invention include solid glass spheres, hollow glass spheres, solid ceramic spheres, hollow ceramic spheres, potato starch, tabular alumina, calcium sulfate hemihydrate, calcium sulfate dehydrate, calcium carbonate, ultrahigh molecular weight polyethylene, polyamide, poly-cyclic-olefins, polyurethane, polypropylene, and combinations thereof.

It may be preferable that the insoluble filler consist mostly of spherical shaped particles with a particle size distribution with 10% less than 30 to 40 microns, with 90% less than 90 to 125 microns, with 50% between 50 to 70 microns. Angular, non-spheroid shaped particles with wide particle size distributions with 10% less than 3 to 30 microns, with 90% less than 60 to 90 microns, and with 50% of the particles between 20 to 60 microns are to be avoided or used less than 10% by weight in the particulate material in order to provide low capillary pressure which in turn lowers the amount of distortion. The addition of angular shaped particles may decrease the average capillary radius of the particulate material thus increasing capillary pressure and increasing distortion of the final article.

Capillary pressure may be described by Equation 1 below, which is derived into a simple form from the equation of Young and Laplace:

$$\Delta p = 2\gamma_{lv} \cos \theta / r \qquad \text{Equation 1}$$

where $\Delta p$ is the capillary pressure, which is the pressure difference across the fluid interface, $\gamma_{lv}$ is the surface tension at the liquid-vapor interface of the fluid, r is the average radius of the capillaries, and $\theta$ is the contact angle at the fluid-solid interface.

The contact angle, $\theta$, is the angle of contact between a liquid and solid. A contact angle of 0° suggest that the fluid will spontaneously wet the entire surface of the solid to which it is applied, while a contact angle greater than 90° suggests that the fluid will not spontaneously spread and wet the surface of the solid to which it is applied. Spontaneously used herein is in reference to thermodynamic equilibrium, and does not denote an instance of time. The contact angle may be defined by the Young and Dupré equation:

$$\cos\theta = \frac{\gamma_{sv} - \gamma_{sl}}{\gamma_{lv}} \qquad \text{Equation 2}$$

where $\gamma_{sv}$ is the surface energy at the solid and vapor interface, and $\gamma_{sl}$ is the surface energy at the solid and liquid interface. The difference of $\gamma_{sv}-\gamma_{sl}$ in the numerator of Equation 2 may be defined as the adhesion tension of the solid at the solid-liquid-vapor interfaces. It may be desirable to have this adhesion tension greater than or equal to the surface tension of the fluid at the liquid-vapor interface. The adhesion tension may be related to the surface characteristic defined as the critical surface tension by Zisman, which is described in the following paragraphs.

One can see from Equation 1 that capillary pressure increases if the average radius of the capillaries decreases and/or if the contact angle increases through an increase of the fluid's surface tension, and/or the adhesion tension of the solid decreases. This effect of capillary pressure infiltrating a porous medium may be measured by the Washburn infiltration method. The Washburn equation describes the time a fluid takes to infiltrate into and through porous medium. The Washburn equation is often used in the following form:

$$\cos\theta = \frac{m^2}{t} \frac{\eta}{\rho^2 \sigma c} \qquad \text{Equation 3}$$

where $\theta$ is the contact angle at the liquid-solid interface, m is the mass of fluid, t is time, $\eta$ is the viscosity of the fluid, $\rho$ is the density of the fluid, and c is a material constant.

Figure 5:
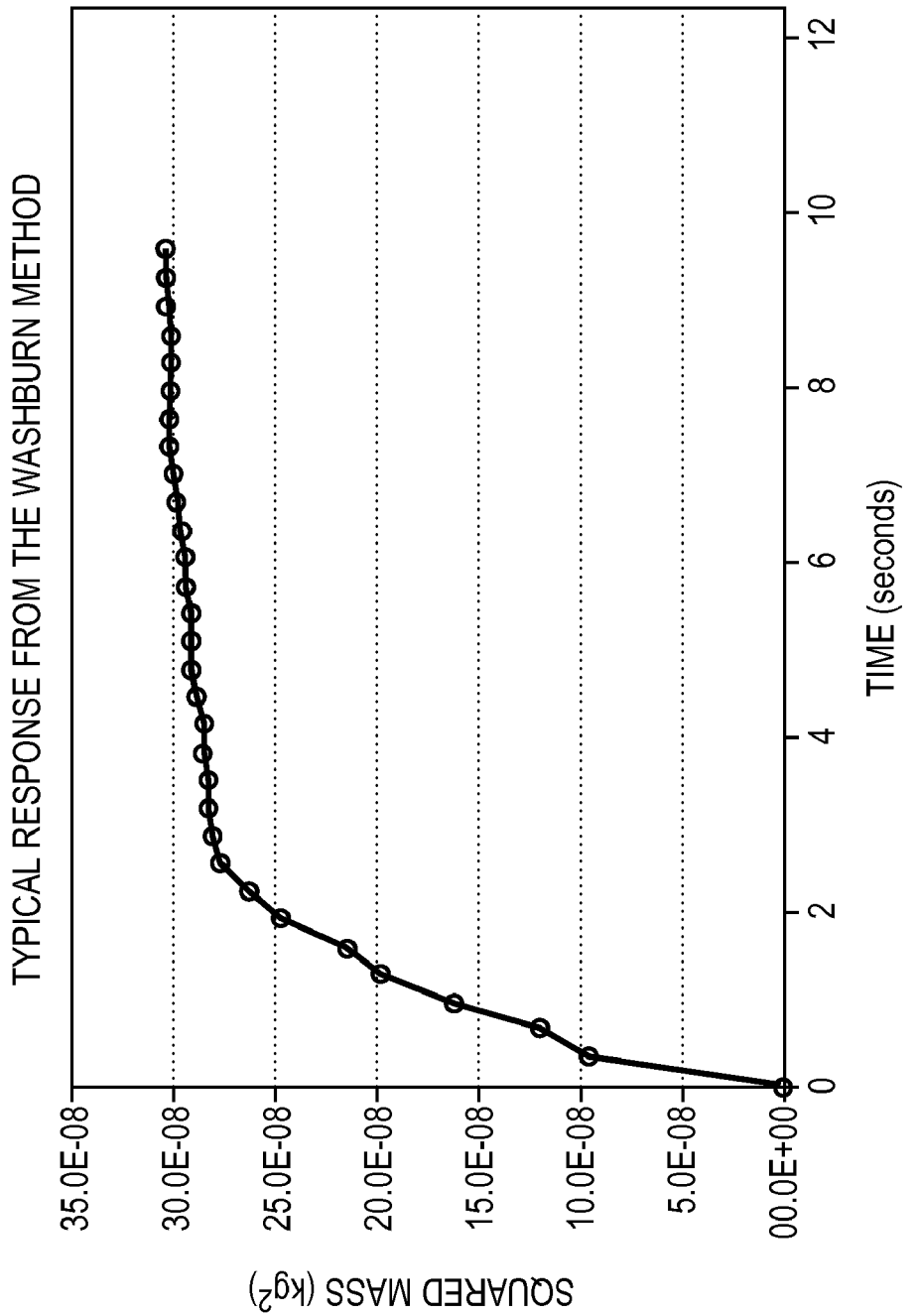
FIG. 5 is a graph illustrating a typical response from the Washburn infiltration method to determine the material constant and contact angle of a fluid against a particulate material.

The material constant c may be determined by infiltrating a porous medium with a very low surface tension fluid that will have a contact angle of 0° against the solid surface of particles comprising the porous medium. n-Hexane is a common fluid used for such purposes, having a surface tension of 18 dynes/cm; it is assumed to have a contact angle of 0° against most solid surfaces. This makes the value of cos $\theta$ equal to 1 in Equation 3, thereby making it possible to solve for the material constant c since the fluid properties of n-hexane are known. This leaves one to measure the rate of mass increase of the fluid infiltrating the porous medium over time. This mass-time response may be measured by use of a Krüss Processor Tensiometer K100 with accessories for Washburn contact angle measurement, available from KRUSS USA based in Mathews, N.C., or by use of a KSV Sigma 70 Tensiometer from KSV Instruments USA based in Monroe, Conn. With these instruments, a vial of powder is prepared. The vial is perforated at a bottom portion, with a piece of porous filter paper preventing the powder from pouring through the perforated bottom. The vial filled with powder is attached to a microbalance, and the bottom of the vial is brought into contact to the surface of the fluid, in this case n-hexane. Software records the mass increase of the vial over time from the microbalance as the fluid is drawn into the powder in the vial largely by capillary pressure. One may then plot the mass squared over time, which should result in a straight line during the time fluid is infiltrating into the powder in the vial (see FIG. 5, that illustrates a typical response from the Washburn infiltration method to determine the material constant and contact angle of a fluid against a particulate material). The slope may be calculated from that plot, which corresponds to the value of $$\frac{m^2}{t}$$

in Equation 3. After the slope is calculated, one may solve for the material constant c.

The material constant c is sensitive to the packing density of the powder in the vial in which it is prepared, so it is preferable to use a method that consistently provides the same packing density in the vial for each test. It is theorized that the material constant has the following relationship:

$$c = \frac{1}{2}\pi^2 r^5 n^2 \qquad \text{Equation 4}$$

where r is the average capillary radius of the porous medium, and n is the number of capillary channels. Loosely packed powder will have a larger average capillary radius increasing the material constant, and, conversely, densely packed powder will have smaller average capillary radius decreasing the material constant.

The Washburn method described above was used to determine the material constant of (i) a particulate material primarily composed of glass microspheres with a particle size distribution in which 10% of the particles have a particle size, i.e., diameter, of less than 50 microns, 50% are less than 70 microns, and 90% are less than 100 microns and (ii) a particulate material primarily composed of glass microspheres with calcium sulfate hemihydrate which is an angular, non-spheroid shape particle with a particle size distribution in which 10% of the particles have a particle size of less than 5 microns, 50% are less than 25 microns, and 90% are less than 70 microns. The results are given in Table 1.

Referring to Table 1, a comparison of material constants shows a significant difference between the two particulate formulations. The particulate material consisting primarily of glass microspheres exhibits a material constant almost six times greater than the particulate material formulation consisting of the 50/50 blend by hulk volume of glass microspheres and calcium sulfate hemihydrates. This difference suggests that the angular grains of the calcium sulfate hemihydrate impart a denser packed particulate material that leads to much smaller average capillary radii. The larger material constant of the particulate material consisting primarily of glass microspheres suggest a larger average capillary radius, allowing for a lower capillary pressure and thus would exhibit lower distortions on printed articles.

Figure 6A:
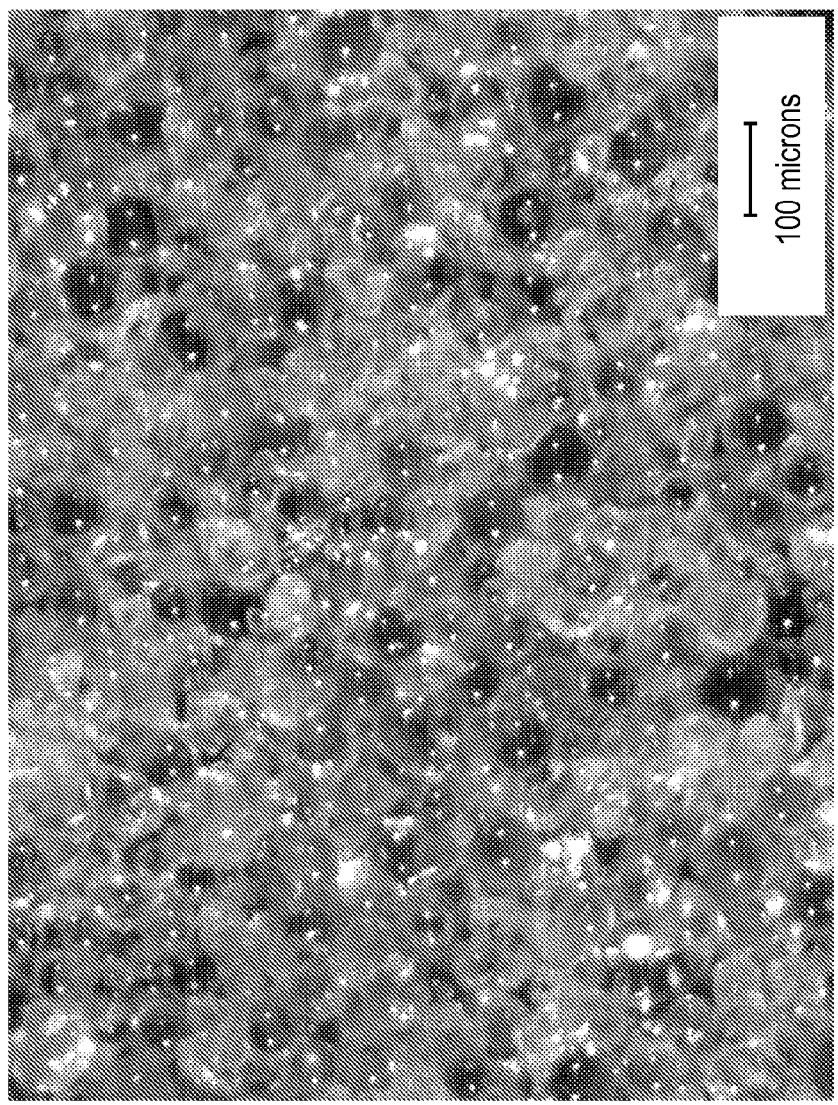
FIG. 6a is a magnified image of the particulate material consisting primarily of glass microspheres and a soluble filler as the secondary component.
Figure 6B:
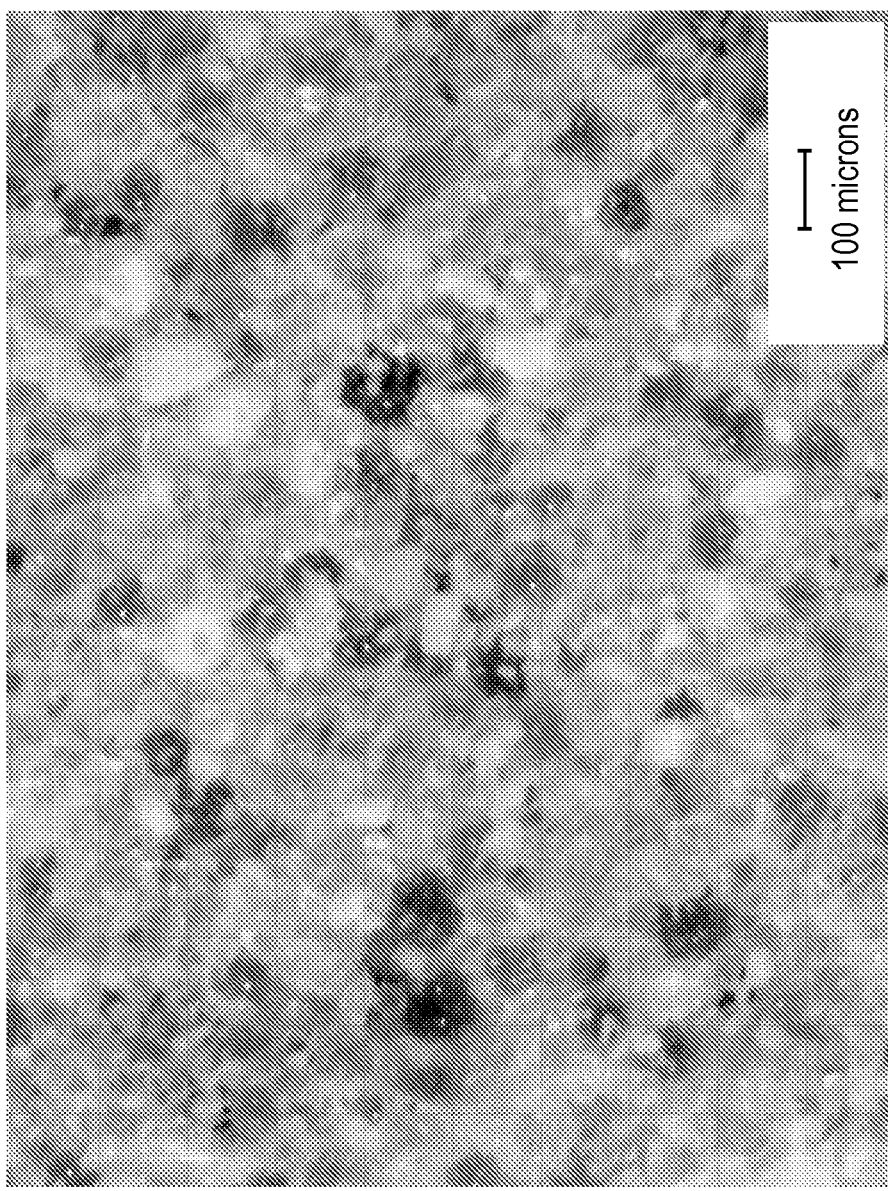
FIG. 6b is a magnified image of the particulate material consisting of a 50/50 blend by bulk volume of glass microspheres and calcium sulfate hemihydrates with a soluble filler as the third component.

Referring to FIGS. 6a and 6b, magnified images taken from an Olympus SZX12 microscope of both particulate material formulations illustrate the particle distribution of the two materials. FIG. 6a is a magnified image of the particulate material consisting primarily of glass microspheres and a soluble filler as the secondary component. FIG. 6b is a magnified image of the particulate material consisting of a 50/50 blend by bulk volume of glass microspheres and calcium sulfate hemihydrates with a soluble filler as the third component.

The Washburn method may also be utilized to determine the contact angle the fluid binder forms with the particulate material, since the material constant is can be determined for each particulate formulation. The fluid binder formulation of Table 2 was used to determine the contact angle the fluid has with each of the above particulate formulations of Table 1

TABLE 1

| | Particulate material consisting primarily of glass microspheres | | Particulate material consisting a 50/50 blend by bulk volume of glass microspheres with calcium sulfate hemihydrate | | |
|---|---|---|---|---|---|
| Ingredient | % by wt. | % bulk volume | Ingredient | % by wt. | % bulk volume |
| Potters Spheriglass 2530 CP03 | 83.76% | ~66% | US Gypsum Hydrocal | 38.96% | ~33% |
| Lucite Elvacite 2014 | 15.89% | ~34% | Potters Spheriglass 2530 CP03 | 44.80% | ~33% |
| Sigma-Aldrich Light Mineral Oil | 0.19% | Nil | Lucite Elvacite 2014 | 15.89% | ~34% |
| Sigma-Aldrich Cobalt Octoate, 65% in Mineral Spirits | 0.16% | Nil | Sigma-Aldrich Light Mineral Oil | 0.19% | Nil |
| | | | Sigma-Aldrich Cobalt Octoate, 65% in Mineral Spirits | 0.16% | Nil |
| Washburn Method Material Constant | 86.0E−09 m$^5$ | +/−3.3E−09 m$^5$ at 95% confidence | Washburn Method Material Constant | 15.0E−09 m$^5$ | +/−0.7E−09 m$^5$ at 95% confidence |

TABLE 2

| Fluid Binder Ingredients | % by wt. |
| --- | --- |
| Sartomer SR209 Tetraethylene glycol dimethacrylate | 57.50% |
| Sartomer SR-506 Isobornyl methacrylate | 30.00% |
| Sartomer CN-9101 allylic oligomer | 10.00% |
| Sigma-Aldrich di-tert-butyl-hydroquinone | 0.05% |
| BYK UV 3500 Surfactant | 0.05% |
| Arkema Luperox CU90 cumene hydroperoxide | 2.40% |
| Physical Properties | |
| Viscosity | 16.0 cP @ 21° C.° |
| Density | 1.044 g/cc |
| Liquid-Vapor Surface Tension | 25.436 dynes/cm |

The contact angles given in Table 3 were determined using the fluid binder of Table 2 to infiltrate each of the particulate material samples in a vial.

TABLE 3

| Particulate material consisting primarily of glass microspheres | Particulate material consisting a 50/50 blend by bulk volume of glass microspheres with calcium sulfate hemihydrates |
| --- | --- |
| θ = 0° +/− 0° (cos θ resulted in a calculated value of 1.48 +/− 0.11 at 99% confidence) | θ = 86° +/− 1° at 99% confidence |

The fluid binder wets the particulate material consisting primarily of glass microspheres better than the formulation containing calcium sulfate hemihydrate because it exhibits a contact angle of zero with the former. Articles printed from the particulate material consisting of calcium sulfate hemihydrate along with glass microspheres exhibit distortions such as the cupping of flat rectangular articles as capillary forces pull particles inward in the printed area where fluid binder is applied. Articles printed from particulate material formulations consisting primarily of glass microspheres between 70-90% by weight, or 50-75% by bulk volume have consistently resulted in articles with very little to no distortion from capillary forces.

The concepts presented here regarding contact angle, capillary pressure, and adhesion tension may be found in the *Physical Chemistry of Surfaces*, Adamson, Arthur W., Interscience Publishers, Inc., 1967, and regarding the Washburn method in "Wettability Studies for Porous Solids Including Powders and Fibrous Materials—Technical Note #302" by Rulison, Christopher, 1996, which is a manufacturer's application note from KRUSS USA, the disclosures of which are incorporated herein by reference in their entireties.

The soluble filler primarily helps to control the migration of binder through the particulate material, which controls bleed or pooling of fluid binder in selectively printed areas, and also provides extra strength and toughness to the final cured article. The soluble filler helps control binder migration of binder by dissolving into the fluid binder deposited in the selective areas to increase the viscosity of the fluid binder that decreases the rate of binder migration. Soluble fillers suitable for use with embodiments of the invention include methyl methacrylate polymers, ethyl methacrylate polymers, butyl methacrylate polymers, polyvinylbutyral, and combinations thereof.

More specifically, a suitable soluble filler is a solid methacrylate polymer with a glass transition temperature between about 40 and about 60 degrees Celsius and a molecular weight from a range of about 100,000 to about 500,000 g/mol. Another example of a suitable soluble filler is a polymethylmethacrylate/ethyl methacrylate co-polymer resin such as ELVACITE 2014, available from Lucite International based in Cordova, Tenn. Another suitable resin is a butylmethacrylatemethylmethacrylate copolymer resin such as NEOCRYL B-723, available from NeoResins based in Wilmington, Mass. The soluble filler may be processed to achieve a particle size distribution where 10% of the particles are less than 20 to 30 microns, and 90% of the particles are less than 80 to 100 microns, and 50% of the particles are between 50 and 70 microns. In some embodiments, the particulate material may be non-reactive such that it does not swell or dissolve in the fluid binder.

The effect of a molecular weight of the soluble filler may be measured with a Texture Analyzer TA-XT2i from Stable Micro System based in the United Kingdom. This instrument may be used to measure a three-point flexural strength of a bar 5 mm thick, 5.7 mm wide, and 50 mm long created from the application of fluid binder onto the particulate material on a three-dimensional printer, supported on a two-point span spaced at a distance of 40 mm. The force to break the test part with the force applied at the center of the 40 mm span may be used to calculate an estimate of flexural strength. The distance to break the test part is also recorded which may estimate the amount of strain the bar endures. Higher flexural distances at break, as the strength increase, may relate to increased toughness of the article. This test was performed on particulate material formulations using soluble fillers with varying molecular weights listed in Table 4 using the fluid binder composition listed in Table 5.

TABLE 4

| Ingredients | A | B | C | D | E | F | G | Notes |
| --- | --- | --- | --- | --- | --- | --- | --- | --- |
| Potter's Spheriglass 2530 CP03 | 84.57% wt. | 83.18% wt. | 85.65% wt. | 85.47% wt. | 82.54% wt. | 84.23% wt. | 83.66% wt. | |
| Dianal America MB-2847 | 13.93% wt. | | | | | | | MW = 238,000 g/mol |
| Lucite Elvacite 2014 | | 15.44% wt. | | | | | | MW = 119,000 g/mol |
| Lucite Elvacite 2046 | | | 13.01% wt. | | | | | MW = 165,000 g/mol |
| Lucite Elvacite 2927 | | | | 13.01% wt. | | | | MW = 19,000 g/mol |

TABLE 4-continued

| Ingredients | A | B | C | D | E | F | G | Notes |
|---|---|---|---|---|---|---|---|---|
| Lucite Elvacite 4026 | | | | | 14.96% wt. | | | MW = 33,000 g/mol |
| Lucite Elvacite 4044 | | | | | | 14.48% wt. | | MW = 110,000 g/mol |
| DSM NeoResins NeoCryl B723 | | | | | | | 15.03% wt. | MW = 200,000 g/mol |
| Kronos 2310 Titanium Dioxide | 1.05% wt. | 1.05% wt. | 1.07% wt. | 1.07% wt. | 2.06% wt. | 1.05% wt. | 1.05% wt. | |
| Sigma-Aldrich Light Mineral Oil | 0.24% wt. | 0.23% wt. | 0.16% wt. | 0.24% wt. | 0.23% wt. | 0.13% wt. | 0.16% wt. | |
| Sigma-Aldrich Cobalt Octoate, 65% in mineral spirits | 0.21% wt. | 0.10% wt | 0.11% wt. | 0.21% wt. | 0.21% wt. | 0.11% wt. | 0.10% wt. | |

TABLE 5

| Ingredient | % by Weight |
|---|---|
| Sigma-Aldrich Polyethylene glycol dimethacrylate (Mn = ~330 g/mol) | 47.50% |
| Sigma-Aldrich Isobornyl Acrylate | 29.85% |
| Sartomer CN9101 Allylic Urethane Oligomer | 14.93% |
| Sigma-Aldrich Trimethylol ethoxylate triacrylate (Mn = ~428) | 4.98% |
| Luperox CU90 cumene hydroperoxide | 2.19% |
| Sigma-Aldrich 4-methoxyphenol | 0.05% |
| Eastman Dimethylacetoacetamide | 0.5% |

Figure 7:
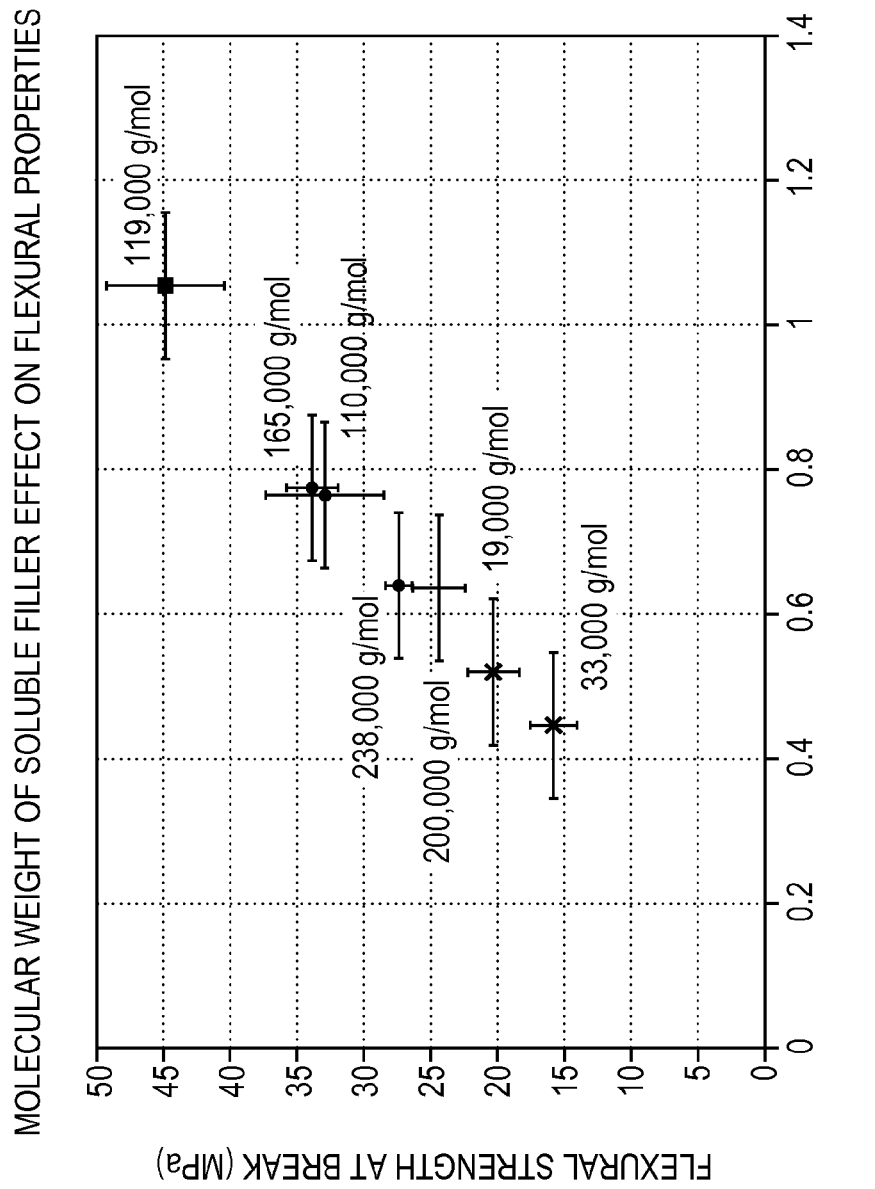
FIG. 7 is a plot of flexural strength and flexural distance at break of particulate materials using soluble fillers with varying molecular weights.

The flexural test bars were printed on a Spectrum Z®510 Three Dimensional Printer available from Z Corporation in Burlington, Mass. modified to use a SM-128 piezoelectric jetting assembly along with an Apollo II Printhead Support Kit both available from FUJIFILM Dimatix based in Santa Clara, Calif. The flexural test bars were printed applying the fluid binder listed on Table 5 through the SM-128 jetting assembly over the particulate material at a layer thickness of 100 microns. The fluid was deposited selectively and uniformly at each layer to occupy 32% by volume of the flexural test part. The flexural test parts were allowed to solidify for 1 hour before they were extracted from the build bed of the Spectrum Z510 and placed in a 60° C. oven for 12 hours to cure. Table 6 summarizes flexural properties of the particulate material compositions that were measured. Referring to FIG. 7, a graphical representation of the results collected is provided. The results suggest that soluble fillers with molecular weights less than 100,000 g/mol exhibit lower flexural properties than soluble fillers with molecular weights greater than 100,000 g/mol.

TABLE 6

| Formulation | Flexural Strength at Break | Flexural Distance at Break |
|---|---|---|
| A | 27.6 +/− 1.1 MPa at 90% confidence | 0.6 +/− 0.1 mm at 90% confidence |
| B | 44.9 +/− 4.2 MPa at 90% confidence | 1.1 +/− 0.1 mm at 90% confidence |
| C | 33.9 +/− 1.9 MPa at 90% confidence | 0.8 +/− 0.1 mm at 90% confidence |
| D | 20.4 +/− 2.0 MPa at 90% confidence | 0.5 +/− 0.1 mm at 90% confidence |
| E | 15.9 +/− 1.7 MPa at 90% confidence | 0.4 +/− 0.1 mm at 99% confidence |
| F | 33.2 +/− 4.3 MPa at 90% confidence | 0.8 +/− 0.1 mm at 90% confidence |
| G | 24.4 +/− 2.0 MPa at 90% confidence | 0.6 +/− 0.1 mm at 99% confidence |

Inclusion of pigments may be used to impart a neutral color to provide a greater color gamut and a high brightness to make white-looking articles. Preferably, the particulate material may include pigments in a concentration of 0.5-5% by weight. Titanium dioxide is a pigment with a refractive index of 2.4 that may be used, but its listing as a possible IARC carcinogen makes it undesirable for use in an office environment. Zinc oxide is an alternative pigment with a refractive index of 2.0, and it is not listed as a carcinogen. Zinc oxide, available from Sigma-Aldrich based in Milwaukee, Wis., imparts the most neutral color over titanium dioxide. Other suitable pigments include zinc sulfide, barium sulfate, zirconium silicate, lead carbonate, and hollow borosilicate glass spheres.

Pigments may also be incorporated and bound into the insoluble filler or soluble filler, which may be advantageous to prevent the particulate material from exhibiting excessive dust and to agglomerate as the unbound pigments may adhere to the processing aids used to control the desired spreading characteristics, causing the particulate formulation to lose its desired flowability characteristics. OMNICOLOR UN0005 from Clariant based in Charlotte, N.C., is white colorant compound of pigment and a resin for injection molded plastics which can be use as an alternative pigment source where the pigment is bound in the resin, reducing the dustiness and maintaining the desired flowability characteristics while providing color. This colorant and other types of colorant commonly used in injection molding applications may also be used to color the soluble filler, such as ELVACITE 2014, through melt processing to make a more uniform colored particulate formulation. DECOSOFT and DECOSILK are pigmented polyurethane and acrylic microbeads respectively from Microchem based in Erlenback, Switzerland commonly used to make colored or transparent, low gloss, soft-feel coatings. These products may be used as an insoluble filler to impart tougher material properties while imparting the desired color because of the pigment incorporated into the microbead product, thus decreasing the dust and maintaining the desired flowability characteristics.

The transition metal catalyst may induce the decomposition of the organic hydroperoxide in the fluid binder to generate free radicals and to catalyze the absorption of oxygen for allyllic polymerization. Transition metals are metal ions that have multiple oxidation states and can readily lose or gain electrons in the presence of oxidizing or reducing agents, respectively. Metal catalysts based on copper, iron, vanadium, manganese titanium, and cobalt are preferred, although other metal catalysts may be used. In particular, one suitable transition metal catalyst includes cobalt (II) octoate in 65% mineral spirits from Sigma-Aldrich based in St. Louis, Mo. Other suitable metal catalysts include, e.g., cobalt (II) naphthenate, vanadium (II) octoate, manganese naphthenate, and combinations thereof.

Processing aids may be used to affect particulate material spreading characteristics to achieve a desirable internal angle of friction (see discussion below) and to reduce capillary forces between the particulate material in contact with the fluid binder. Processing aids can further assist in reducing nuisance dust of the particulate material. Mineral oil is a typical processing aid that affects the flowability of the particulate material; it may be used from 0.01% to 1% by weight in the particulate formulation. The particulate material remains substantially dry upon the inclusion of this small amount of mineral oil. Mineral oil, e.g., from Sigma-Aldrich, may provide a good balance of particulate cohesion and low plasticizing of the soluble filler without reducing capillary pressure. Hydrogenated hydrocarbon resins, such as REGALREZ 1094 from Eastman based in Kingsport, Tenn., are tackifiers that may be used as processing aid to increase the viscosity of the mineral oil and may be 0.01 to 2% by wt of the particulate material. The hydrocarbon resin increases the viscosity of the processing aid that imparts a unique cohesiveness and flowability characteristic, whereby the particulate material, under shear from a counter-rolling spreader rod, becomes a free-flowing powder. The desired cohesion is restored while at rest to resist dragging while successive layers are being spread. The increase in viscosity assists in the fracture of the inter-particle adhesive necks of fluid that the processing aids create to control flowability characteristics under shear; the adhesive necks of fluid then slowly reform while the particulate material is at rest. The inter-particular adhesive necks of fluid that lower viscosity processing aid imparts do not fracture as easily under shear because the processing aids are allowed to flow more easily and faster to reform the inter-particular adhesive necks of fluid.

Other processing aids suitable for use with embodiments of the invention include, e.g., propylene glycol di(caprylate/caprate), petroleum jelly, propylene glycol, di-isobutyl phthalate, di-isononyl phthalate, polyalkyleneoxide modified heptamethyltrisiloxanes, polyalkyleneoxide modified polydimethylsiloxanes, secondary alcohol ethoxylates, hydrogenated hydrocarbon resins, and combinations thereof.

A surfactant is a typical processing aid that may be used in conjunction with mineral oil to reduce the capillary forces between the particulate material in contact with the fluid binder by increasing the critical surface tension of the particulate material. Surfactants may be used in a range of 0 to 1% by weight of the particulate material. Silicone surfactants, such as SILWET L-7608 or COATOSIL L-77 from General Electric Company based in Wilton, Conn. having a reported capability of reducing surface tension of water to less than 25 dynes/cm, may effectively reduce capillary forces between particles of the particulate material in contact with the non-aqueous fluid binder. Secondary ethoxylated alcohols hydrocarbon surfactants, such as TERGITOL 15-S-7 and TERGITOL-15-S-5 from DOW based in Midland, Mich., also may effectively reduce capillary forces between particles of the particulate material in contact with the non-aqueous fluid binder.

Figure 8:
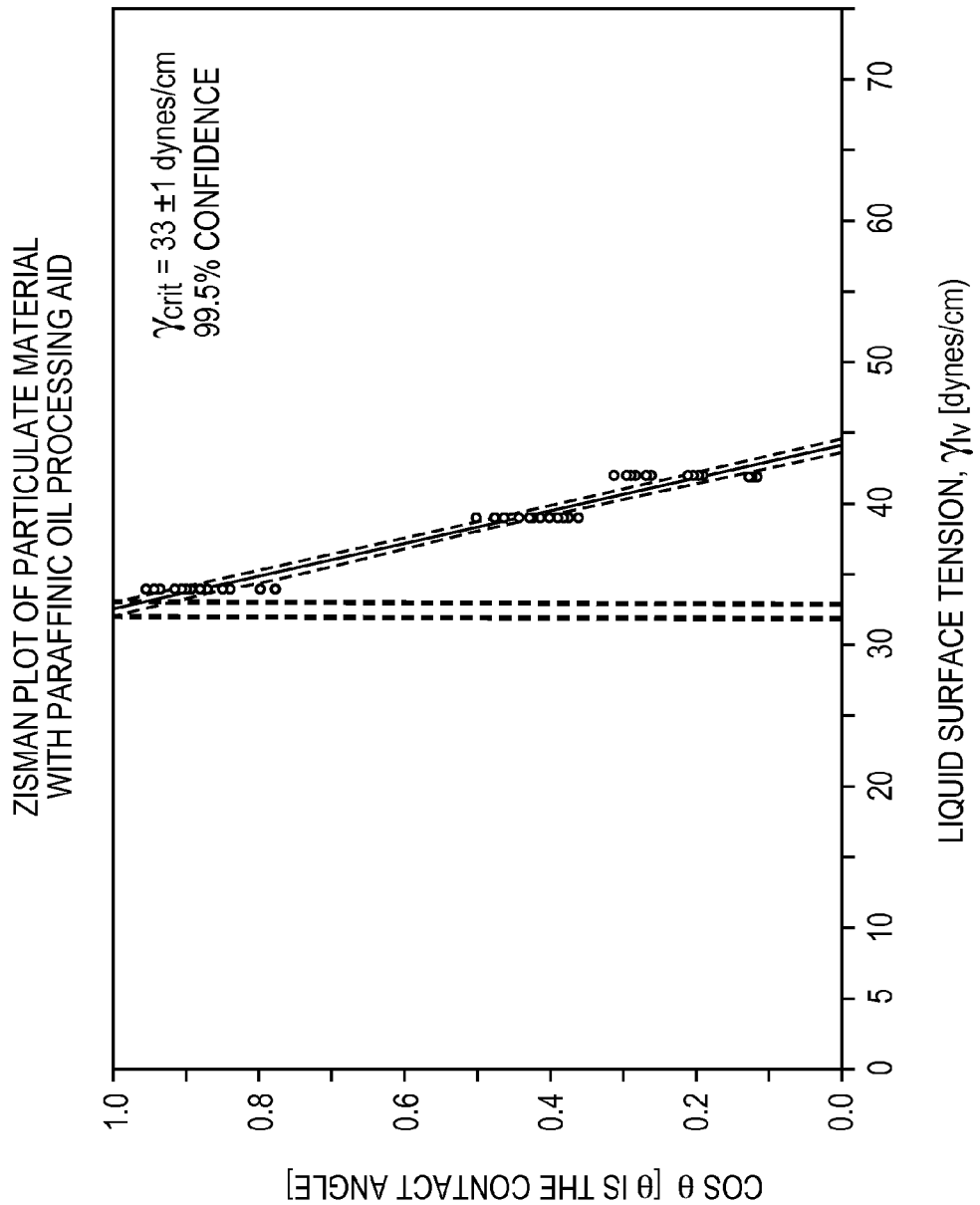
FIG. 8 is a Zisman plot of a particulate material using a mineral oil processing aid.
Figure 9:
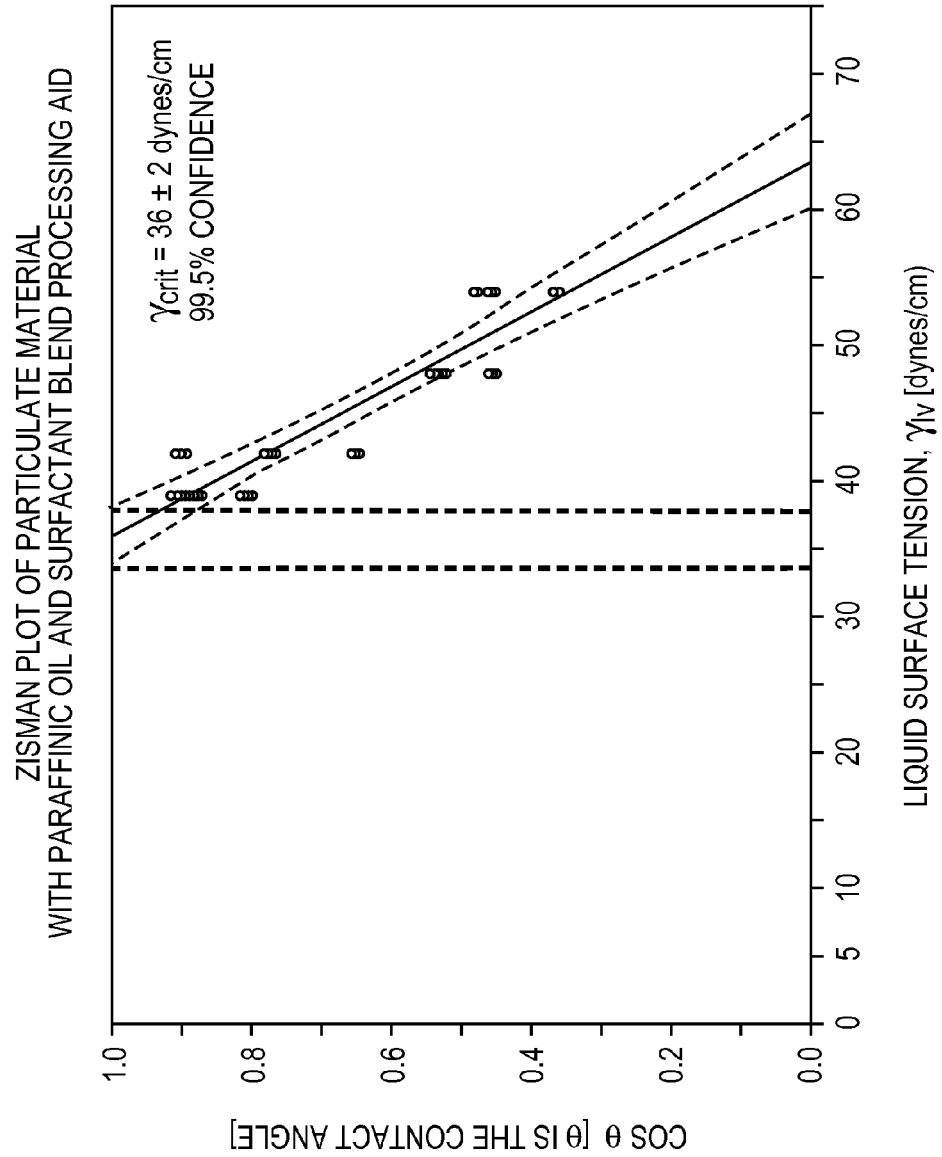
FIG. 9 is a Zisman plot of a particulate material using a combination of mineral oil and a secondary ethoxylated alcohol surfactant as a processing aid.

The effect of the surfactant increasing the surface energy of the particulate material may be measured using the Washburn method describe earlier by infiltrating a particulate material formulation with a series of liquid solutions with varying surface tension values. The contact angles, $\theta$, are determined for each surface tension. Then the cos $\theta$ values are plotted against the surface tension values to construct a Zisman plot. The data are used to linearly extrapolate a trend line to the value where cos $\theta$ equals 1 (when $\theta=0°$) to determine the critical surface tension of the particulate material which was described earlier to be related to the adhesion tension of the solid at the solid-liquid-vapor interfaces. This test was performed on the formulations listed in Table 7. See FIGS. 8 (particulate material with paraffinic oil processing aid) and 9 (particulate material with a paraffinic oil and surfactant blend processing aid).

Further discussion regarding critical surface tension may be found in *Physical Chemistry of Surfaces*, Adamson, Arthur W., interscience Publishers, inc., 1967, and regarding the Washburn method in "Wettability Studies for Porous Solids Including Powders and Fibrous Materials—Technical Note #302" by Rulison, Christopher, 1996, which is a manufacturer's application note from KRUSS USA; these disclosures are incorporated herein by reference in their entireties.

TABLE 7

| | Particulate material prepared with a paraffinic oil processing aid | | Particulate material prepared with a paraffinic oil and surfactant processing aid | | |
| --- | --- | --- | --- | --- | --- |
| Ingredient | % by wt. | % bulk volume | Ingredient | % by wt. | % bulk volume |
| MO-SCI GL0179 glass microspheres | 83.81% | ~66% | MO-SCI GL0179 glass microspheres | 83.85% | ~66% |
| Lucite Elvacite 2014 | 15.73% | ~34% | Lucite Elvacite 2014 | 15.73% | ~34% |
| Sigma-Aldrich | 0.24% | Nil | Sigma-Aldrich | 0.18% | Nil |

TABLE 7-continued

| | Particulate material prepared with a paraffinic oil processing aid | | | Particulate material prepared with a paraffinic oil and surfactant processing aid | |
|---|---|---|---|---|---|
| Ingredient | % by wt. | % bulk volume | Ingredient | % by wt. | % bulk volume |
| Light Mineral Oil | | | Light Mineral Oil | | |
| Sigma-Aldrich Cobalt Octoate, 65% in Mineral Spirits | 0.22% | Nil | DOW TERGITOL 15-S-5 | 0.18% | Nil |
| | | | Sigma-Aldrich Cobalt Octoate, 65% in Mineral Spirits | 0.06% | Nil |
| Zisman Plot Critical Surface Tension | 33 +/− 1 dynes/cm at 99.5% confidence | | Zisman Plot Critical Surface Tension | 36 +/− 2 dynes/cm at 99.5% confidence | |

There is a slight increase in the critical surface tension of the particulate material including a surfactant, suggesting that using a surfactant as at least part of the processing aid may help to decrease capillary pressure exerted by the fluid binder as it wets the powder.

Fluid Binder

One preferred embodiment of a fluid binder suitable for Three Dimensional Printing includes or consists essentially of:

| | |
|---|---|
| (meth)acrylate monomer | 40-90 wt % |
| (meth)acrylate oligomer | 0-40 wt % |
| allyl ether functional monomer/oligomer | 5-25 wt % |
| organic hydroperoxide | 0.5-5 wt % |
| accelerator | 0-2 wt % |
| surfactant | 0-1 wt % |

The (meth)acrylate (i.e., methacrylate and/or acrylate) monomers and oligomers provide the properties of strength and flexibility. Such monomers and oligomers may be procured from Sartomer based in Exton, Pa.

The allyl ether monomer/oligomer provides the oxidative drying of the binder on the surface of the article so that the surface is not tacky. Allyl ether monomers may be procured from Perstorp based in Sweden. Suitable oligomers with allyl functionality may be obtained from Sartomer, who offers CN-9101 urethane allyl functional oligomer. Bomar Specialty Chemicals based in CT offers BX1-100, a poly-allyl-glycidyl-ether oligomer, another suitable allyl functional oligomer.

The organic hydroperoxide is the free radical initiator for the anaerobic polymerization of the (meth)acrylate monomers and oligomer, and the aerobic polymerization of the allylic monomer/oligomer. A suitable organic hydroperoxide is cumene hydroperoxide available as LUPEROX CU90 from Arkema based in Philadelphia, Pa. The transition metal catalyst induces the decomposition of the organic hydroperoxide, thus providing free radicals for subsequent reactions and catalyzes the absorption of oxygen at the surface. Another organic hydroperoxide suitable for use with some embodiments is tert-butyl hydroperoxide, is available as T-HYDRO from Lyondell Chemical Company based in Houston Tex.

The surfactant is a preferred additive in the formulation of the fluid binders used in Three Dimensional Printing to reduce the surface tension of the binder so that the surface tension is equal to or less than the critical surface tension of the particulate material, such that the contact angle of the fluid binder against the particulate material is less than 25°, but preferably closer to if not equal to 0°. This allows the fluid binder to wet out onto the particulate material without creating large capillary forces that may cause (i) fissuring at points where the printed area on the particulate material splits apart and (ii) balling where the fluid binder sits on the surface of the particulate material. Both of these occurrences may cause surface defects on the bottoms of flat surfaces of printed articles.

Figure 10A:
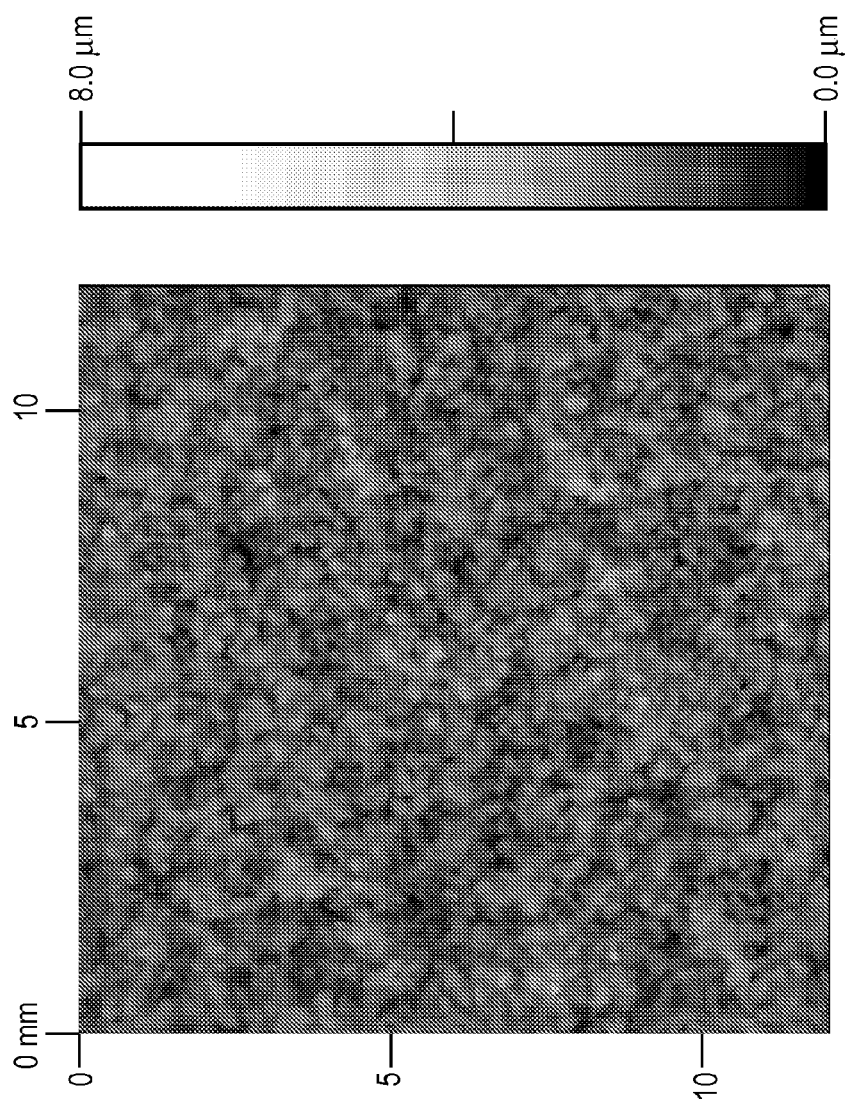
FIGS. 10a and 10b are laser profilometer images comparing the effect of proper and poor binder wetting on the bottom surfaces of articles.
Figure 10B:
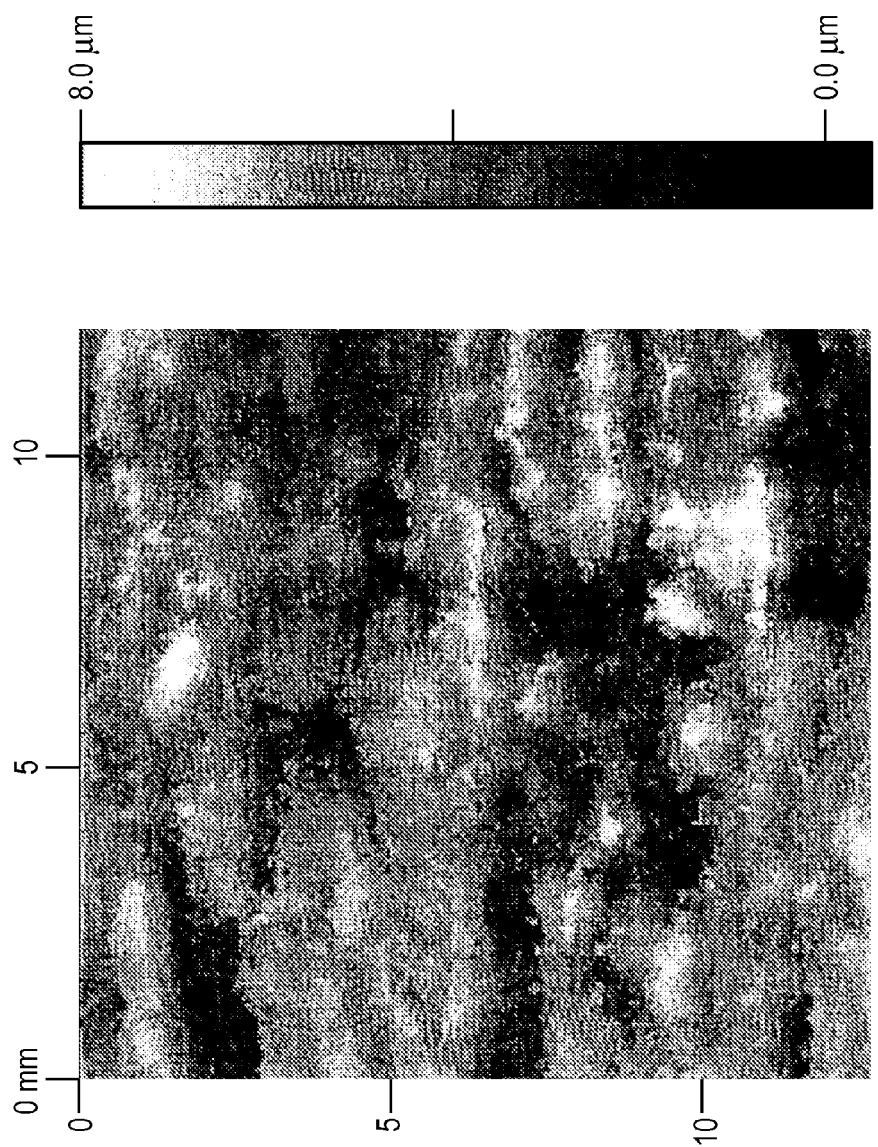

Referring to FIGS. 10a and 10b, the effect of the fluid binder formulation is illustrated by laser profilometer scans of flat bottom surfaces of articles at 50 micron resolution on the x and y axes. FIG. 10a illustrates an example of good wetting behavior with contact angles less than 25° when the binder has a surface tension at or below a critical surface tension of the particulate material and wets smoothly over the particulate material. For example, the critical surface tension of the particulate material may be greater than 20 dynes/cm. FIG. 10b illustrates an example of poor wetting behavior with contact angles greater than 25° when the binder has a surface tension greater than the critical surface tension of the particulate material causing the binder to wet irregularly over the particulate material and creating fissures.

A suitable surfactant is a polyether modified acryl functional polydimethylsiloxane surfactant available as BYK UV 3500 from BYK Chemie based in Hartford, Conn. This surfactant is a wetting agent commonly used in UV curable coatings to ensure a smooth finish on substrates and, when used at 0.05% by weight in the fluid formulation, reduces the surface tension to about 25+/−1 dynes/cm. Other suitable surfactants may include fluorinated surfactants such as the ZONYL surfactants available from DuPont, which can reduce the surface tension of the fluid binder down to 20 dynes/cm.

Fluid formulations of various embodiments of the instant invention are somewhat similar to anaerobic adhesive formulations commonly known as "threadlockers" such as LOCTITE 290 from Loctite based in Rocky Hill, Conn. and which is disclosed by Krieble in U.S. Pat. No. 2,895,950 assigned in 1957 to American Sealants Company based in Hartford, Conn., incorporated herein by reference in its entirety. Aerobically curing formulations using allyl ethers are also known to the art, as described by Cantor et al. in U.S. Pat. No. 5,703,138 assigned to Dymax Corporation, incorporated herein by reference in its entirety. FUJIFILM Dimatix based in Santa Clara, Calif. has a published application note describing the application of LOCTITE 290 adhesive through one of their piezo jetting assemblies to accurately deliver adhesive to a substrate. However, these formulations do not include a surfactant. The fluid adhesive products described in these references do not have the proper surface tension requirements needed for proper wetting, if they were applied onto the particulate material as described in various embodiments of the instant invention. These materials are not intentionally designed to have a surface tension lower than that of the substrate to which they are to be applied, thereby achieving a contact angle of less than 25 degrees. This can be demonstrated by using the Washburn method with the following particulate formulation (Table 8) and binder formulations (Tables 9 and 10).

TABLE 8

Particulate material prepared with a mineral oil and surfacant processing aid

| Ingredient | % by wt. | % bulk volume |
|---|---|---|
| MO-SCI GL0179 glass microspheres | 83.85% | ~66% |
| Lucite Elvacite 2014 | 15.73% | ~34% |
| Sigma-Aldrich Light Mineral Oil | 0.18% | Nil |
| DOW TERGITOL 15-S-5 | 0.18% | Nil |
| Sigma-Aldrich Cobalt Octoate, 65% in Mineral Spirits | 0.06% | Nil |

TABLE 9

| | % by wt. |
|---|---|
| Fluid Binder Ingredients | |
| Sartomer SR209 Tetraethylene glycol dimethacrylate | 57.50% |
| Sartomer SR-506 Isobornyl methacrylate | 30.00% |
| Sartomer CN-9101 allylic oligomer | 10.00% |
| Sigma-Aldrich di-tert-butyl-hydroquinone | 0.05% |
| BYK UV 3500 Surfactant | 0.05% |
| Arkema Luperox CU90 cumene hydroperoxide | 2.40% |
| Physical Properties | |
| Viscosity | 18.3 cP @ 19.9° C. |
| Density | 1.004 g/cc |
| Liquid-Vapor Surface Tension | 23.733 dynes/cm |

TABLE 10

| LOCTITE 290 Properties | |
|---|---|
| Viscosity | 14.0 @ 19.9° C. |
| Density | 1.088 g/cm$^3$ |
| Liquid-Vapor Surface Tension | 35.0 dynes/cm |

TABLE 11

| Fluid Binder in Table 6 | LOCTITE 290 |
|---|---|
| θ = 0° (cos θ values calculated to 1.10 +/− 0.03 at 99% confidence) | θ = 61° +/− 1° |

Referring to Table 11, the high contact angle LOCTITE 290 has on the particulate material formulation indicates that this product would not wet out properly onto the particulate material when applied during Three Dimensional Printing, and would create articles with rough, irregular bottom surfaces, having defects similar to the defects illustrated in FIG. 10b. A fluid binder properly formulated to have a surface tension lowered to at least 25 dynes/cm so that it has a contact angle less than 25° and close to, if not equal to 0° will wet out the powder properly, resulting in a smooth bottom facing surface with less edge curling distortion, as is exhibited in FIG. 10a.

Surfactants may be used in photocurable inkjet fluid formulation, as disclosed, for example, in U.S. Pat. No. 6,433,038 to Tanabe, where surfactants are used to stabilize dyes and pigments in the disclosed fluid inkjet formulation. Huo et al., in an international patent application PCT/US2005/025074 disclose the use of surfactants to improve wettability of the fluid over non-porous plastic substrates and to control the dynamic surface tension of the fluid for faster meniscus reformation at the nozzle of a DOD device during jetting. These formulations do not use surfactants to decrease the capillary pressure exerted by the fluid when applied on a particulate material, as disclosed herein.

Figure 11:
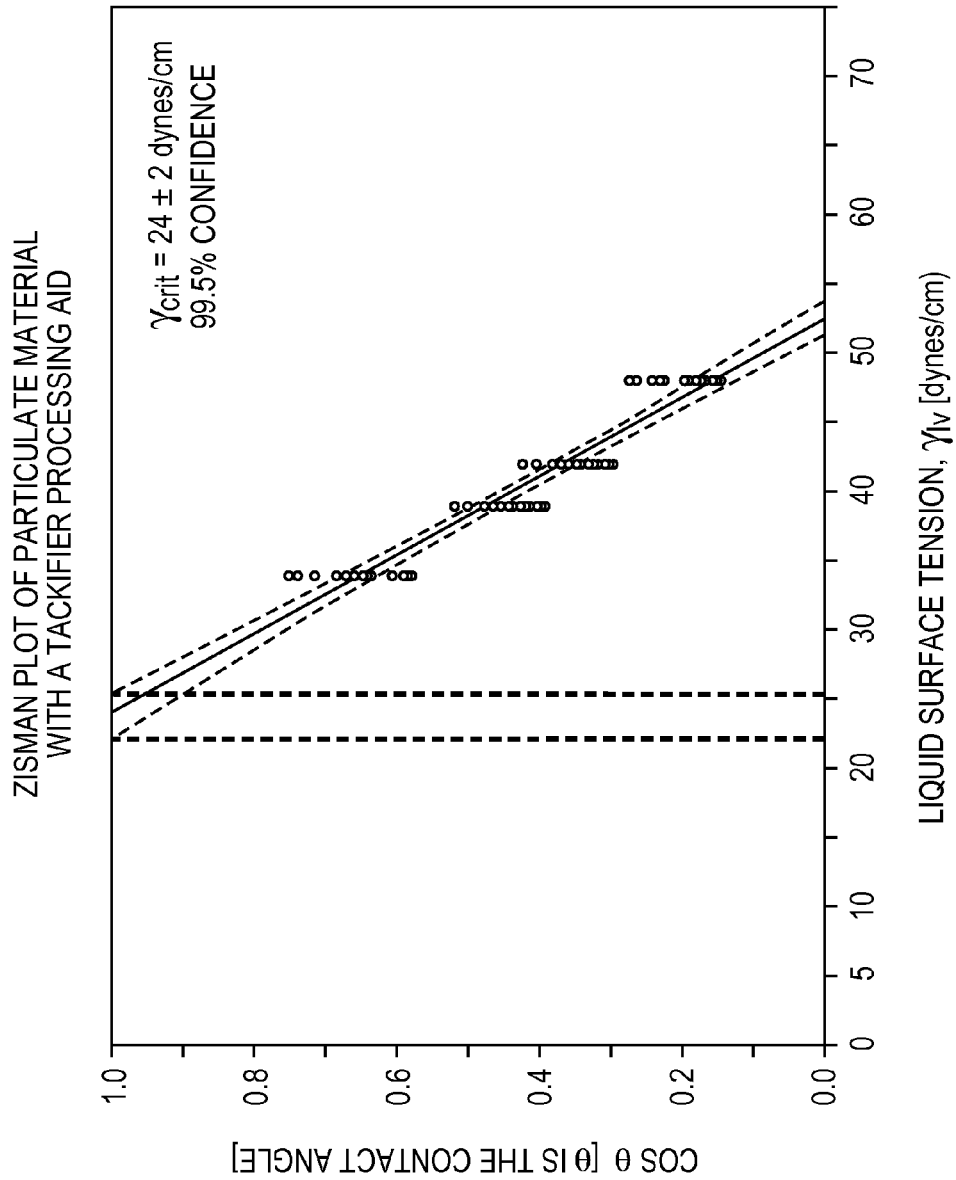
FIG. 11 is a Zisman plot of a particulate material using a combination of a saturated hydrocarbon resin and mineral oil as a processing aid.

Another exemplary formulation listed on Table 12 shows a particulate powder formulation with a lower critical surface tension than critical surface tensions of particulate formulations disclosed on Table 7. See FIG. 11, which is a Zisman plot of a particulate material including a tackifier processing aid. The surface tension of the fluid binder is essentially at the critical surface tension of the particulate material, and therefore results in a contact angle equal to 0°. The contact angle may be greater than 0° and possibly less than 25° if the critical surface tension is 2 dynes/cm less than the surface tension of the binder. This upper limit of a contact angle is estimated from Equation 2 by dividing the critical surface tension of the solid by the surface tension of the fluid. The contact angle of the fluid binder against both of the particular material listed in Table 12 was determined from the Washburn method to have an average cos θ value of 1.02+/−0.05 at 99% confidence, which would result in a contact angle between 0° and 14° within the 99% confidence interval range of the cos θ value. This fluid binder, when applied to the particulate material disclosed in Table 12, results in proper wetting of the fluid binder over the particulate material to impart a smooth bottom finish, as illustrated in FIG. 10a.

TABLE 12

| Particulate Material Ingredients | % by wt. | Fluid Binder Ingredients | % by wt |
|---|---|---|---|
| MOSCI GL0179 glass microspheres | 84.58% | Sartomer SR-423A Isobornyl Acrylate | 20.00% |
| Elvacite 2014 | 15.20% | Sartomer SR-209 Tetraethylene glycol dimethacrylate | 67.55% |
| Regalrez 1094 | 0.10% | Sartomer CN9101 Allylic Oligomer | 10.00% |
| Light Mineral Oil | 0.07% | di-tert-butyl hydroquinone | 0.05% |
| Tergitol 15-S-5 | 0.01% | BYK UV 3500 surfactant | 0.05% |
| Cobalt Octoate, 65% in mineral spirits | 0.04% | Luperox CU90 | 2.4% |
| | | Physical Properties | |
| Zisman's Critical Surface Tension | 24 +/2 dynes/cm at 99.5% confidenece | Viscosity | 17.5 cP @ 24° C. |
| | | Surface Tension | 23.733 dynes/cm |
| | | Density | 1.004 g/cc |

Kit

A kit may include various combinations of the substantially dry particulate material and a fluid binder described above. For example, a kit may include (i) a substantially dry particulate material comprising an insoluble filler, a soluble filler, and a transition metal catalyst, and (ii) a fluid binder including a (meth)acrylate monomer, at least one of an allyl ether functional monomer or an allyl ether functional oligomer, and an organic hydroperoxide.

The fluid binder may have a contact angle of less than 25° on the particulate material. In an embodiment, the fluid binder may include about 40%-95% by weight of the (meth)acrylate monomer, about 5-25% by weight of the allyl ether functional monomer/oligomer, and about 0.5-5% by weight of the organic hydroperoxide. The fluid binder may also include 0%-1% by weight of surfactant. The fluid binder may include a (meth)acrylate oligomer, e.g., about 10-40% by weight of the (meth)acrylate oligomer. The fluid binder may also include a first accelerator such as dimethylacetoacetamide, e.g., up to about 2% by weight of the first accelerator.

A 1 mm penetration hardening rate of the substantially dry particulate material upon application of the fluid binder may be e.g., 0.01/min to 1.0/min. The dry particulate material may include a pigment and/or a processing aid.

Printing Method

An article may be defined by selectively printing the fluid binder over particulate material. The fluid binder includes a (meth)acrylate monomer, a (meth)acrylate oligomer, an allyl ether functional monomer and/or oligomer, and organic hydroperoxide and, optionally, a first accelerator. The amount of binder deposited onto the particulate layer can range from 20% to 35% of the volume of the selectively printed area at a predetermined layer thickness between 50 to 175 microns, and more preferably between 75 and 125 microns. The particulate material includes a plurality of adjacent particles, comprising a transition metal catalyst and, at least one of an insoluble filler, a soluble filler, a pigment, a second accelerator, and a processing aid. The transition metal catalyst induces decomposition of the organic hydroperoxide to generate free radicals. The free radicals initiate anaerobic polymerization of the (meth)acrylate monomer and oligomer, and aerobic polymerization of the allyl ether functional monomer/oligomer.

The complete polymerization, i.e., cure, of the article may take between about 30 minutes and about 6 hours to complete after the formation of a solid article, after all the layers of the article have been printed. In a conventional UV curing process, the curing happens substantially instantaneously, so that the printed article may be removed from the printer as soon as the printing is complete. Sano, in U.S. Patent Application Publication No. 2007/0007698 and U.S. Pat. No. 7,300,613, describes primarily the use of photocurable resins applied onto powder via a drop-on-demand printhead as well as two component curing strategies such as epoxy-amine thermosetting resins; Kramer, et al, in U.S. Pat. No. 7,120,512 assigned to Hewlett-Packard in Houston, Tex., also disclose the use of photocurable resins applied over powder using a drop-on-demand printhead, as well as alternative embodiments of two component systems.

It was found that photocurable fluid binders are generally not suitable for Three Dimensional Printing because of the instantaneous curing leading to immediate shrinkage, which leads to the first 2 to 10 layers of selectively printed areas to curl and warp out of the plane of the build bed to be eventually dragged and displaced in or completely off the build bed. Sano suggests the use of photocurable resins that polymerize via ring opening mechanism such as epoxides and oxetanes to limit the degree of shrinkage. However, such mechanisms tend to be sensitive to humidity and the alkalinity of the environment and substrate to which the resins are applied.

Patel, et al., have international applications published through the World Intellectual Property Organization (publication numbers WO 03/016030 and WO 02/064354 A1) with Vantico as the assignee (now owned by Hunstman based in TX) that describe the use of various embodiments of applying photocurable resins and two-component resins. Three Dimensional Printing apparatuses and methods using ultraviolet cure are disclosed by Yamane, et al, in U.S. Pat. No. 5,149,548 assigned to Brother Kogyo Kabushiki Kaisha in Japan, which describes the use of a two part curable resin utilizing microcapsules encapsulating a curing agent deposited with a drop-on-demand printhead. The microcapsules are broken upon exposure to ultraviolet light.

Oriakhi, et al., in the U.S. Patent Application 2005/0093194 assigned to Hewlett-Packard, discloses the use of a particulate material comprising primarily a polymeric filler and a peroxide initiator, and a fluid binder comprising an activator for the peroxide initiator. This is the reverse of the current embodiment, and also does not include an aerobic curing mechanism for the surface of the article.

In embodiments of the current invention employing a peroxide cure process, a user typically waits the above-indicated time after the article is printed before removing the article from the printer. The article may be heated to a range of about 40° C. to about 100° C. to accelerate the aerobic cure at the surface of the article. Heat may be supplied through convection, conduction, infra-red radiation, microwave radiation, radio-wave radiation, or any other suitable method.

The cure rate between a photocurable binder and the current embodiment may be illustrated by comparing the hardening rate by measuring the force it takes to penetrate 1 mm into the surface of a mass mixture consisting of fluid binder and particulate material with a 0.5 inch spherical probe. Such a test of a 1 mm penetration hardening rate may be performed with a Texture Analyzer TA-XT2i with a P/0.5S stainless steel spherical probe from Stable Micro System based in the United Kingdom. The following particulate material system used in this test is listed in Table 13.

TABLE 13

| Ingredient | % by wt. A | % by wt. B | % by wt. C |
|---|---|---|---|
| MO-SCI GL0179 glass microspheres | 83.85% | 83.69% | 83.88% |
| Lucite Elvacite 2014 | 15.73% | 15.73% | 15.73% |
| Sigma-Aldrich Light Mineral Oil | 0.18% | 0.18% | 0.18% |
| DOW TERGITOL 15-S-5 | 0.18% | 0.18% | 0.18% |
| Sigma-Aldrich Cobalt Octoate, 65% in Mineral Spirits | 0.06% | 0.22% | 0.03% |

The binder formulation used in this test is given in Table 14.

TABLE 14

| Fluid Binder Ingredients | % by wt. 1 | % by wt. 2 | % by wt. 3 |
|---|---|---|---|
| Sartomer SR209 Tetraethylene glycol dimethacrylate | 57.50% | 57.45% | 69% |
| Sartomer SR-506 Isobornyl methacrylate | 30.00% | 30.00% | 29% |
| Sartomer CN-9101 allylic oligomer | 10.00% | 10.00% | — |
| Sigma-Aldrich di-tert-butyl-hydroquinone | 0.05% | 0.05% | — |
| Sigma-Aldrich hydroquinone | — | 0.05% | — |
| BYK UV3500 Surfactant | 0.05% | 0.05% | — |
| Arkema Luperox CU90 cumene hydroperoxide | 2.40% | 2.40% | — |
| CIBA Irgacure 819 | — | — | 2% |

Mixtures, listed in Table 15, totaling 24 to 26 grams were prepared and placed in a polypropylene dish 40 mm in diameter and 11 mm deep; enough of each of the mixture was used to completely fill the polypropylene dish; usually about 18 to 20 grams.

TABLE 15

| Test | Particulate Material | Fluid Binder | % weight fluid binder | Notes |
|---|---|---|---|---|
| 1 | A | 1 | 16.0% | 1X stabilizer, 60 PPM cobalt(II) |
| 2 | A | 1 | 14.0% | 1X stabilizer, 60 PPM cobalt(II) |
| 3 | A | 1 | 21.0% | 1X stabilizer, 60 PPM cobalt(II) |
| 4 | A | 1 | 17.3% | 1X stabilizer, 60 PPM cobalt(II) |
| 5 | A | 1 | 27.4% | 1X stabilizer, 60 PPM cobalt(II) |
| 6 | B | 1 | 17.3% | 240 PPM cobalt(II), 1X stabilizer |

TABLE 15-continued

| Test | Particulate Material | Fluid Binder | % weight fluid binder | Notes |
|---|---|---|---|---|
| 7 | B | 1 | 27.4% | 240 PPM cobalt(II), 1X stabilizer |
| 8 | A | 2 | 17.3% | 2X stabilizer, 60 PPM cobalt(II) |
| 9 | C | 1 | 17.3% | 30 PPM Cobalt(II) |
| 10 | A | 3 | 17.3% | Photocurable example |

Figure 12:
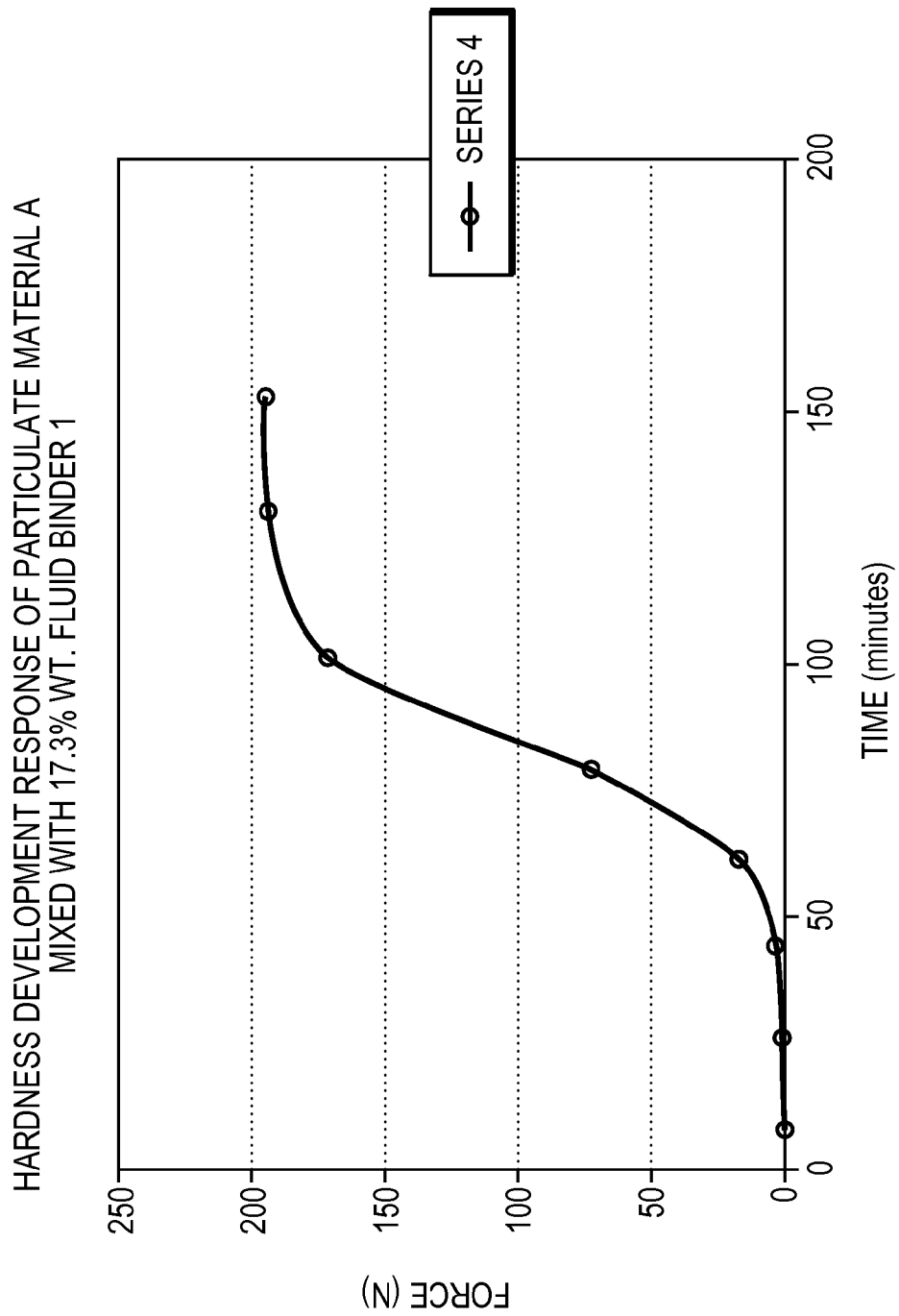
FIG. 12 is a graph illustrating a hardness development response of a particulate material and a fluid binder.
Figure 13:
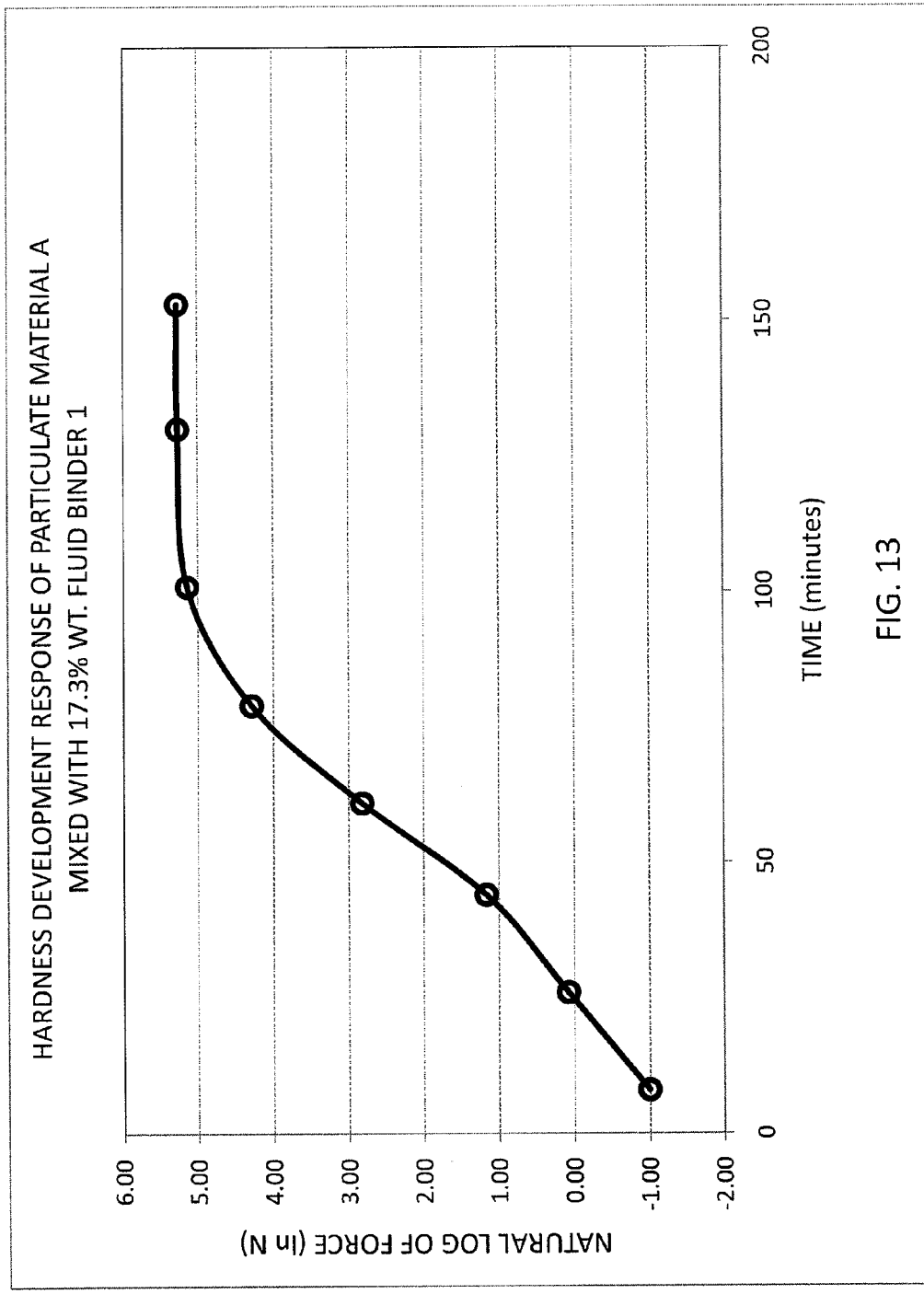
FIG. 13 is the transformed plot of FIG. 11, plotting the natural logarithm of the force measured against time.

The hardness development was measured at 15 minute intervals using the spherical probe to measure the force to penetrate 1 mm into the mixture contained in the polypropylene dish. In the case of the photocurable example, the mixture in the polypropylene dish was exposed to 30 seconds of ultraviolet light using a RC250B Flash Curing unit from XENON Corporation based in Wilmington, Mass. The hardness development of the photocurable example is the plot of the penetration force at 30 seconds. FIG. 12 shows the typical development response collected, i.e., of particulate material A mixed with a fluid binder 1. The natural logarithm of the force is taken to determine the hardening rate from the slope of the transformed data before the force plateaus. Referring to FIG. 13, a transformed plot of FIG. 12 plots the natural logarithm of the force measured against time. The hardness development can be modeled by the following equation:

$$F = F_0 e^{mt}$$

Equation 5 where $F_0$ is the initial penetration force that would be measured at time zero, m is the hardness rate, and t is the time. Table 16 lists hardness rates determined from the data collected.

TABLE 16

| Test | Particulate Material | Fluid Binder | % weight fluid binder | Hardness Rate, m | Notes |
|---|---|---|---|---|---|
| 1 | A | 1 | 16.0% | 0.076/min | 1X stabilizer, 60 PPM cobalt(II) |
| 2 | A | 1 | 14.0% | 0.062/min | 1X stabilizer, 60 PPM cobalt(II) |
| 3 | A | 1 | 21.0% | 0.076/min | 1X stabilizer, 60 PPM cobalt(II) |
| 4 | A | 1 | 17.3% | 0.070/min | 1X stabilizer, 60 PPM cobalt(II) |
| 5 | A | 1 | 27.4% | 0.082/min | 1X stabilizer, 60 PPM cobalt(II) |
| 6 | B | 1 | 17.3% | 0.074/min | 240 PPM cobalt(II), 1X stabilizer |
| 7 | B | 1 | 27.4% | 0.094/min | 240 PPM cobalt(II), 1X stabilizer |
| 8 | A | 2 | 17.3% | 0.051/min | 2X stabilizer, 60 PPM cobalt(II) |
| 9 | C | 1 | 17.3% | 0.055/min | 30 PPM Cobalt(II) |
| 10 | A | 3 | 17.3% | 62/min | Photocurable example |

One can see that the photocurable example exhibits a hardness development rate on the order of 1000× greater than the current embodiment. This hardness rate is related to the rate of conversion of double bonds on the (meth)acrylate monomer. The conversion of the carbon-to-carbon double bonds into single carbon-to-carbon bonds with other monomers decreases the amount of free volume in the fluid binder as it polymerizes. The instantaneous conversion of monomers into a polymer in a photocurable fluid binder causes an instantaneous shrinkage upon exposure to ultraviolet light, which forces selectively printed areas to curl and warp out of the plane of the build bed, causing the selectively printed areas to be dragged and displaced as successive layers are spread. The slower hardening rate of some embodiments relates to a slower conversion rate and where selectively printed areas do not exhibit the immediate distortion of curling and warping out of the plane of the build bed to successively print layer upon layer without dragging or displacement of features on an article. Preferably, the 1 mm penetration hardening rate is between 0.01/minute and 1.0/minute.

Strength development of the current embodiment can also be measured using the earlier described Texture Analyzer to measure a three-point flexural strength of a bar 5 mm thick, 5.7 mm wide, and 50 mm long, supported on a two-point span spaced at a distance of 40 mm. The force to break the test part when applied at the center of the 40 mm span can be used to calculate an estimate of flexural strength. The current embodiment can typically exhibit flexural strengths between 10 and 20 MPa after 60 minutes, and 15 to 25 MPa and greater after 120 minutes in the build bed after the last layer of the article completed printing. This strength represents mostly the anaerobic strength development that occurs within the article, while the aerobic curing occurring within 200 microns from the surface of the article is still ongoing at a slower rate. The article may exhibit a tacky surface at 60 minutes, but may exhibit a durable and handle-able strength.

Figure 14:
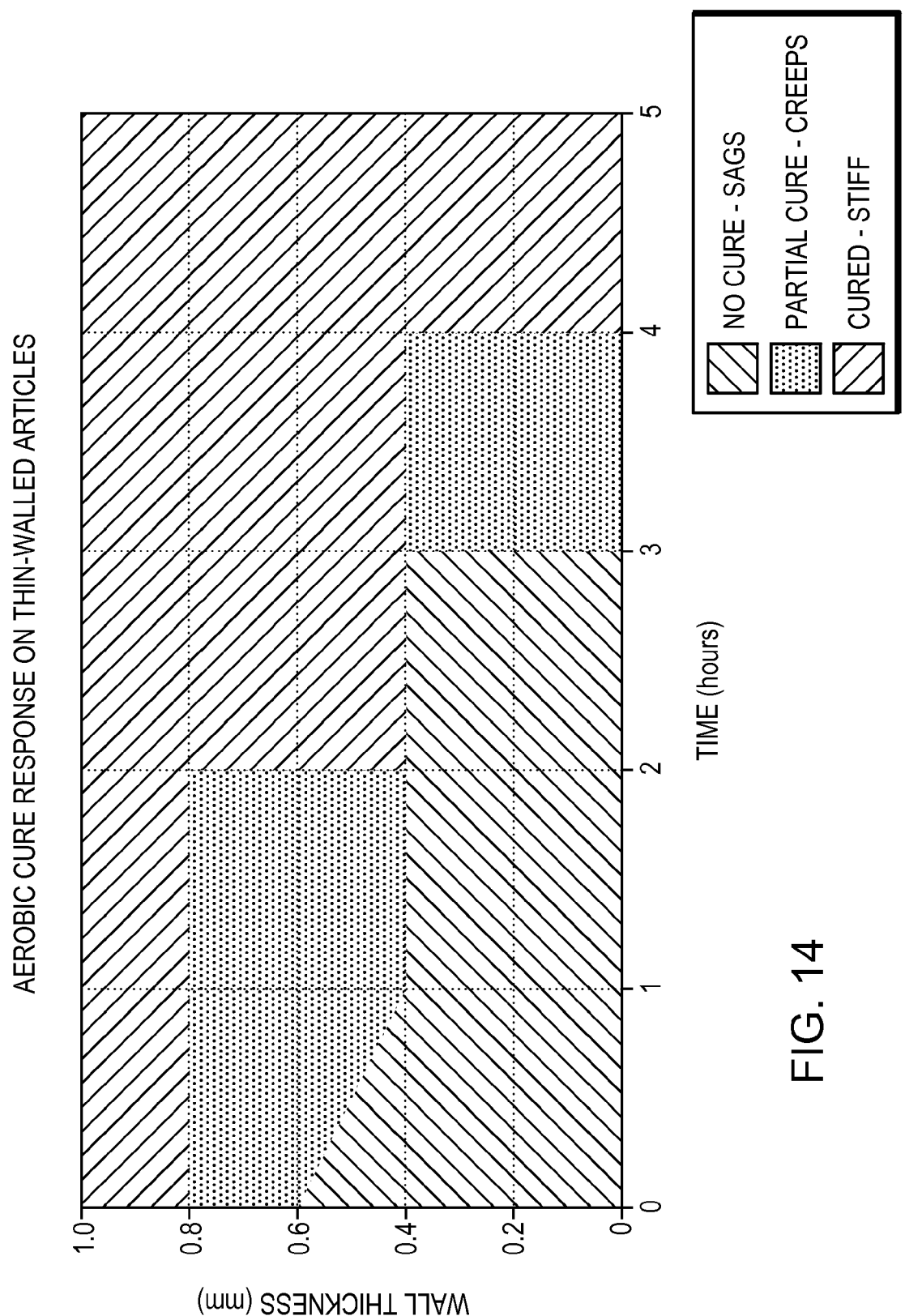
FIG. 14 is a diagram illustrating the aerobic cure response time of thin-walled articles.
Figure 15:
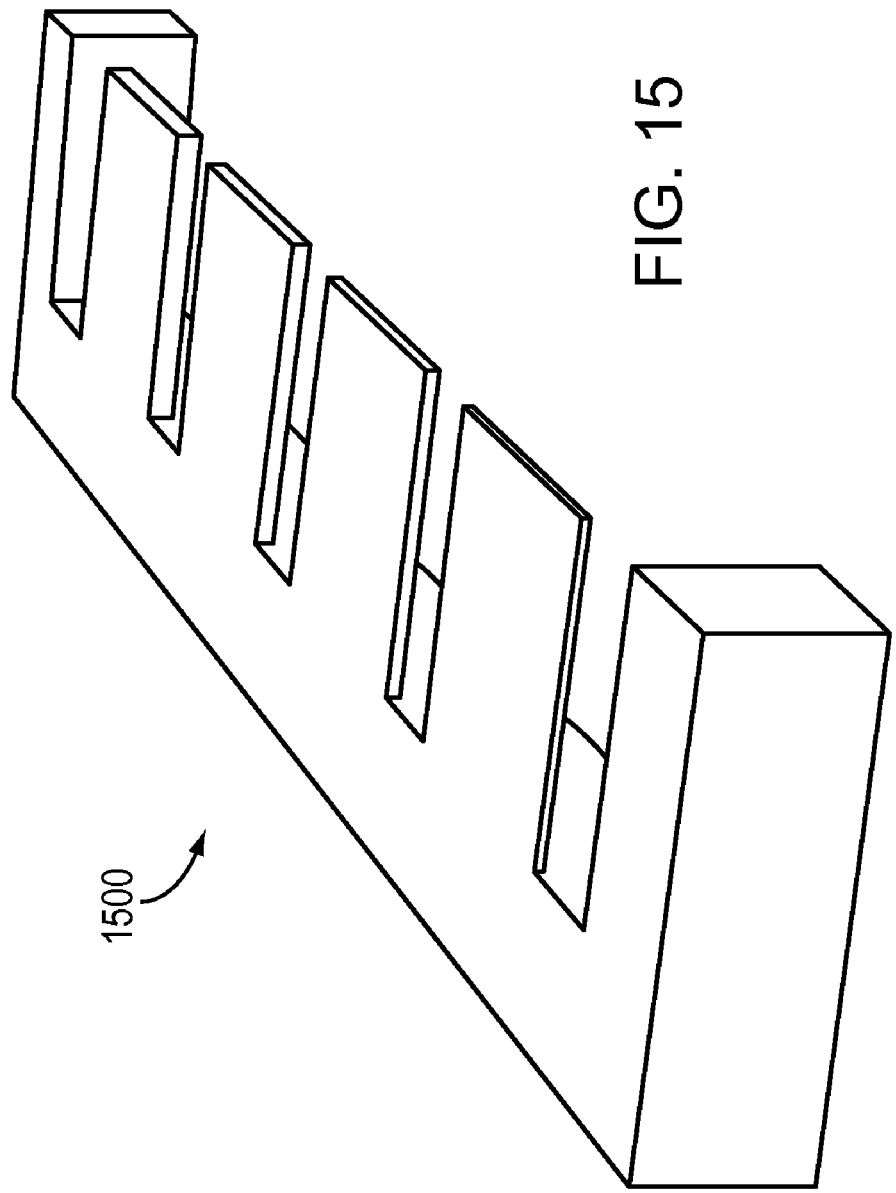
FIG. 15 is a schematic diagram of a test part used to determine aerobic cure response.

FIG. 14 shows the typical response of aerobic cure when measured using the test part 1500 shown in FIG. 15. No curing occurred when the wall on the test part sagged to the point that it touched the bottom surface of the test part 5 mm away. Partial cure occurred when the wall crept and sagged downwards but did not touch the bottom surface of the test part. Full curing occurred when the wall remained horizontal when extracted from the build bed. From this test, it was determined that after 4 hours, an article with wall thickness of 0.4 mm and less would have sufficient duration of aerobic curing to develop enough strength to be extracted from the build bed. The particulate material and fluid binder formulations listed in Table 17 were used to conduct this test.

TABLE 17

| Particulate Material Ingredients | % by wt. | Fliud Binder Ingredients | % by wt |
|---|---|---|---|
| MOSCI GL0179 glass microspheres | 18.25% | Isobornyl Acrylate | 25.00% |
| Potter's T-4 Sign Beads | 70.01% | Sartomer SR454 Ethoxylated Trimethylolpropane Triacrylate | 10.00% |
| Elvacite 2014 | 11.25% | Tetraethylene glycol dimethacrylate | 50.00% |
| Regalrez 1094 | 0.35% | Sartomer CN9101 Allylic Oligomer | 10.00% |
| Light Mineral Oil | 0.09% | di-tert-butyl hydroquinone | 0.05% |
| Tergitol 15-S-5 | 0.02% | BYK UV3500 surfactant | 0.05% |
| Cobalt Octoate, 65% in mineral spirits | 0.03% | Eastman dimethyl acetoacetamide | 2.45% |
| | | Luperox CU90 | 2.45% |

Mechanisms of Anaerobic and Aerobic Reaction of the Peroxide Initiated Material System When a fluid binder including monomers and/or oligomers with (meth)acrylate functional groups, monomers and/or oligomers with allyl functional groups, and an organic hydroperoxide comes in contact with a transition metal catalyst present in a particulate material suitable for Three Dimensional Printing the organic hydroperoxide is decomposed to initiate a free radical polymerization. Two reaction mechanisms can be involved at this point of contact: anaerobic polymerization and aerobic polymerization.

Anaerobic polymerization occurs where no oxygen is present in the interior portions of the three dimensional articles being created, e.g., at depths greater than about 0.2 mm from the surface of the printed article. Aerobic polymerization occurs at the surface and at a depth into which oxygen is capable of diffusing.

A simplified kinetic mechanism for free radical polymerization may be represented by the following steps:

| Radical Generation | Initiator → Free Radicals |
|---|---|
| Initiation | Free radical + Monomer → Radical Monomer |
| Propagation | Radical Monomer + Monomer → Radical Polymer |
| Termination | Radical Polymer + Radical Polymer → Polymer |

Anaerobic radical generation occurs when the hydroperoxide is decomposed by a transition metal capable of oxidizing and reducing its valence charge, such as cobalt. This is represented by the following mechanism:

$$Co^{+2}+ROOH \rightarrow Co^{+3}+RO.+OH^-$$

The oxidized $Co^{+3}$ ion can then be reduced to $Co^{+2}$ via $$Co^{+3}+ROOH \rightarrow Co^{+2}+ROO.+H^+$$

and/or $$Co^{+3}+OH^- \rightarrow Co^{+2}+.OH$$

RO., ROO., and .OH are radicals species that can react with a monomer or oligomer species and start polymerization. The RO. and .OH radicals are more efficient under anaerobic conditions with (meth)acrylate functional monomers and oligomers. Oxygen may react with these radical species to form weak radicals, or may be scavenged by free radical inhibitors that use oxygen to function, such as the most common type of inhibitors based on hydroquinones. The anaerobic polymerization continues to propagate under anaerobic conditions until terminated.

Transition metals like cobalt also assist in the auto-oxidative drying (aerobic curing) of the allyl ether functional monomers or oligomers by increasing oxygen absorption at the surface. A radical center is created at the place of allylic hydrogen, where the hydrogen is abstracted by radicals species from the organic hydroperoxide; or with the assistance of cobalt, the allylic hydrogen is abstracted by oxygen. The radical center of the allyl group now reacts further with oxygen to make a peroxide radical. The peroxide radical species can add to double bonds of (meth)acrylate functional groups or other allyl groups, terminate with other radicals, or abstract further hydrogen atoms from monomers, oligomers, or the propagating polymer. The abstraction of hydrogen atoms with and from allyl ethers has a higher probability to propagate over the termination of peroxy radicals because it can regenerate easily with other abstractable hydrogens present and is abundant in the formulation based on (meth)acrylate and allyl functional monomers and oligomers. This aerobic mechanism proceeds at a much slower rate than the anaerobic mechanism.

The result of this aerobic mechanism is a highly crosslink polymer network that forms a non-tacky surface.

Background information regarding the decomposition mechanisms of hydroperoxides using cobalt may be found in the *Handbook of Adhesive Technology*, Pizzi, A. and Mittal, K. L., Marcel Dekker, Inc., 2003, and regarding the mechanism of allyllic polymerization in "Polyallyl Glycidyl Ether Resins for Very Fast Curing High Performance Coatings," presented by Knapczyk, J. at the 65th Annual Meeting of the Federation of Societies for Coatings Technology, in Dallas, Tex., on Oct. 6, 1987, the disclosures of these references are incorporated herein by reference in their entireties.

Flow Properties of Build Materials

Compositions have been disclosed that relate to control of the flow properties of the build material in Three Dimensional Printers. The three principal methods are the addition of liquid "processing aids," control of grain size distribution, and the addition of solid fillers that contribute to the frictional behavior of the build material. Many candidate materials have been disclosed previously, for example, in U.S. Patent Publication Number 2005/0003189, the disclosure of which is incorporated herein by reference in its entirety. Some mechanical properties of dry particulate build materials are disclosed in the following discussion that are particularly suited for use in Three Dimensional Printing, especially in contrast to other formulations of similar materials for other uses that do not require special flow characteristics of the raw materials.

Figure 16:
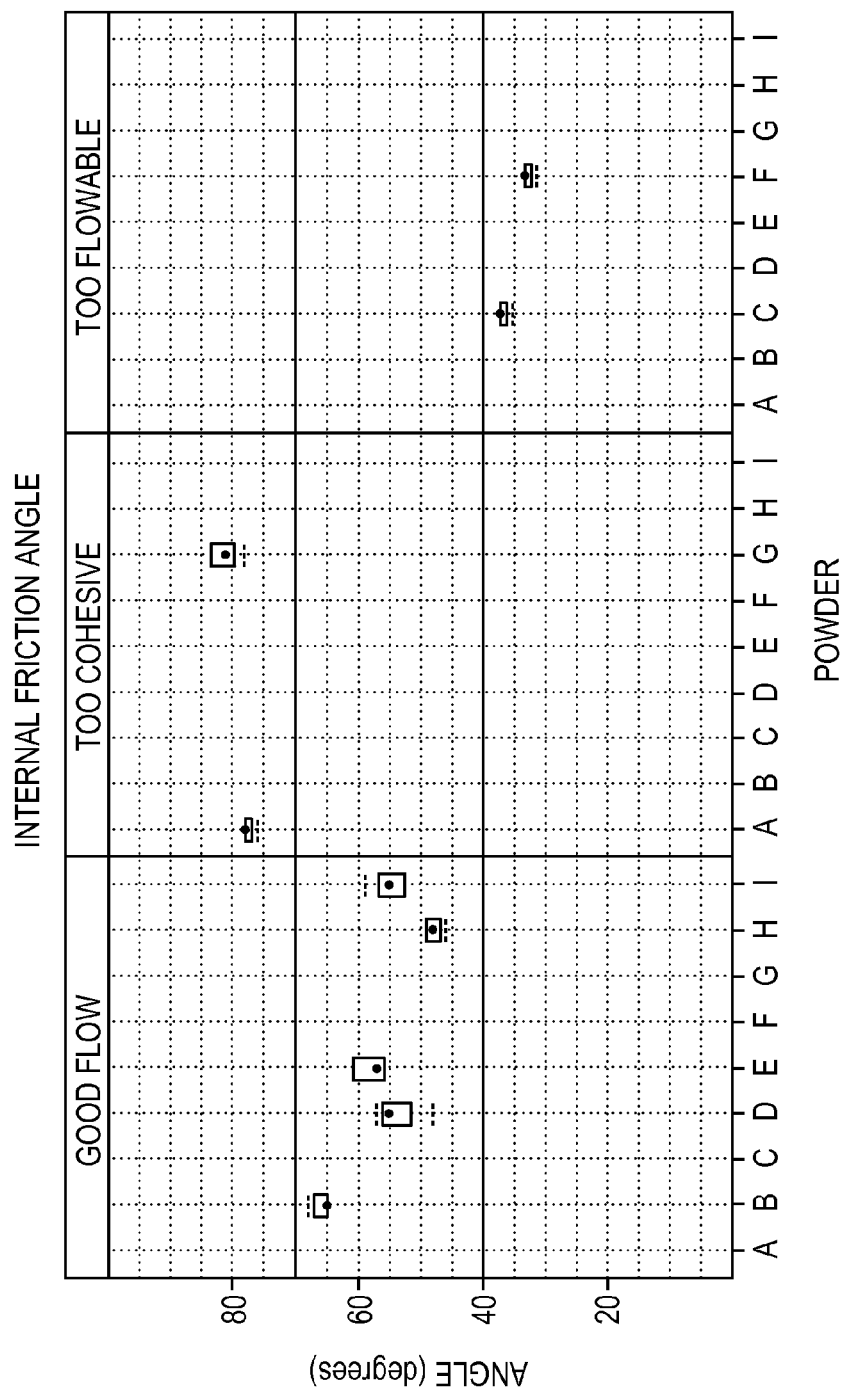
FIG. 16 is a graph illustrating the internal friction angle of various powders.

A method that may be used to quantify a particulate material's suitability for Three Dimensional Printing includes placing 1 liter in bulk volume of a particulate material in a metal cylinder with an inside dimension of 6.1 inches, and inside height of 6.2 inches so that the height of the powder is between 2.5 to 3.0 inches when the cylinder is capped with a translucent cover and laid on its side (i.e., the height of the cylinder is horizontal). The drum is then slowly rolled with a rotational velocity of 2.5 rotations/min+/−0.5 rotations/min until the powder reaches an angle where it avalanches upon itself. The distance that the drum rolled, s, is recorded and the angle, φ, can be determined from Equation 6:

$$\phi = \frac{s}{r} \cdot \frac{180}{\pi} \quad \text{Equation 6}$$

where r would equal the outside radius of the drum. The angle, φ, is the internal angle of friction that particulate material has under these particular test conditions at a room temperature between 65 to 75° F. Various particulate materials known to have good and bad spreading characteristics are compared using this test method, and desirable range of internal angles of friction were determined. Table 18 summarizes the particulate material compositions that were measured. Referring to FIG. 16, a graphical representation of the results collected is provided.

TABLE 18

| Ingredients | Particulate Material Compositions % by wt |  |  |  |  |  |  |  |  |
|---|---|---|---|---|---|---|---|---|---|
| | A | B | C | D | E | F | G | H | I |
| Potter's Spheriglass 2530 CP03 | 84.64% | | 79.72% | | | 100% | 99.8% | | |
| MoSci GL0179 | | 84.58% | | | | | | | |
| Zinc Oxide Pigment | | | 4.75% | | | | | | |
| Lucite Elvacite 2014 | 15.00% | 15.20% | 15.19% | | | | | | |
| Eastman Regalrez 1094 | | 0.10% | | | | | | | |
| Mineral Oil | 0.19% | 0.07% | 0.18% | | | | 0.2% | | |
| DOW Tergitol 15-S-5 | | 0.01% | | | | | | | |
| Cobalt Octoate, 65% in Mineral Spirits | 0.17% | 0.04% | 0.16% | | | | | | |
| Z Corporation zp102 | | | | 100% | | | | | |
| Z Corporation zp100 | | | | | 100% | | | | |
| Z Corporation zp130 | | | | | | | | 100% | |
| Z Corporation ZCast 501 | | | | | | | | | 100% |
| Internal Angle of Friction +/− 95% Confidence Interval | 77° +/− 3° | 64° +/− 3° | 36° +/− 3° | 53° +/− 12° | 59° +/− 13° | 32° +/− 3° | 81° +/− 9° | 48° +/− 5° | 55° +/− 11° |
| Three Dimensional Printing suitability | Too Cohesive | Good | Too Flowable | Good | Good | Too Flowable | Too Cohesive | Good | Good |

Based on the results indicated in Table 18 and illustrated in FIG. 16, one can conclude that powders that have an internal angle of friction greater than 40° and less than 70° are suitable for Three Dimensional Printing.

Figure 17A:
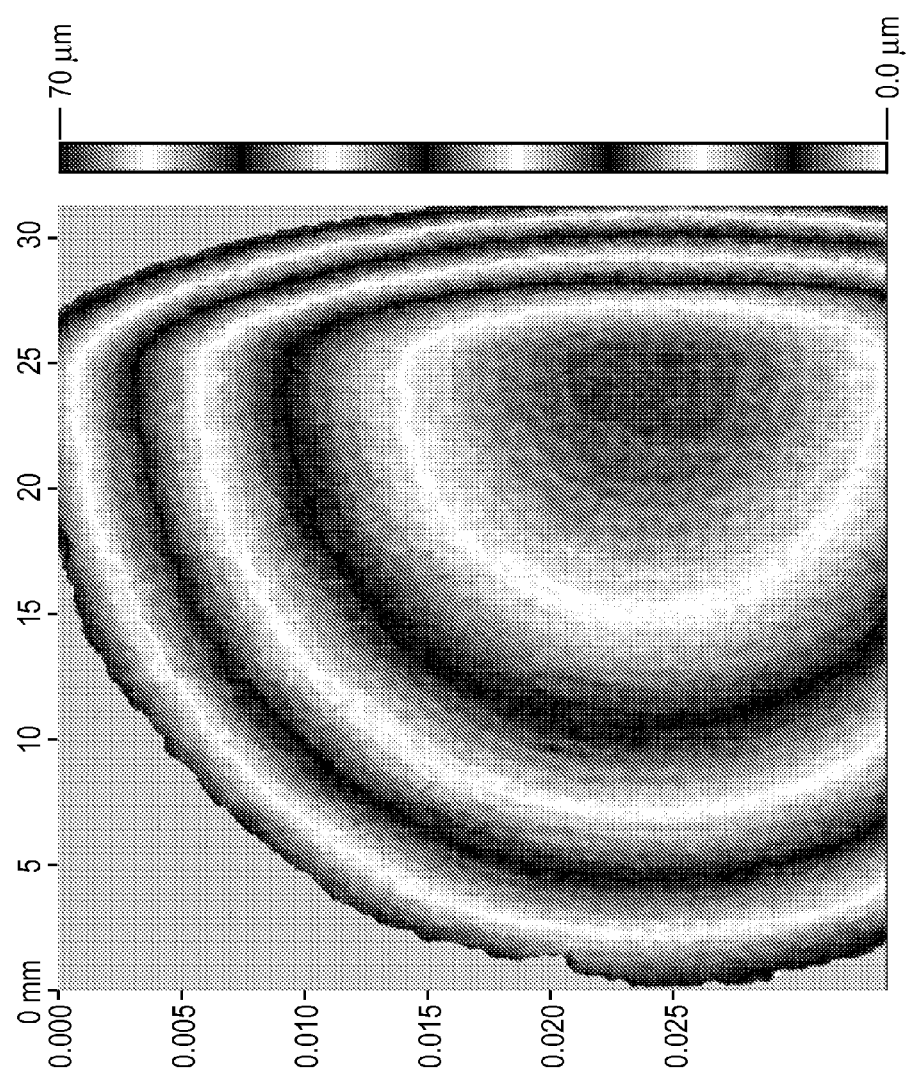
FIGS. 17a and 17b are laser profilometer images comparing the effect of particulate materials with high internal angle of friction on finished article properties.
Figure 17B:
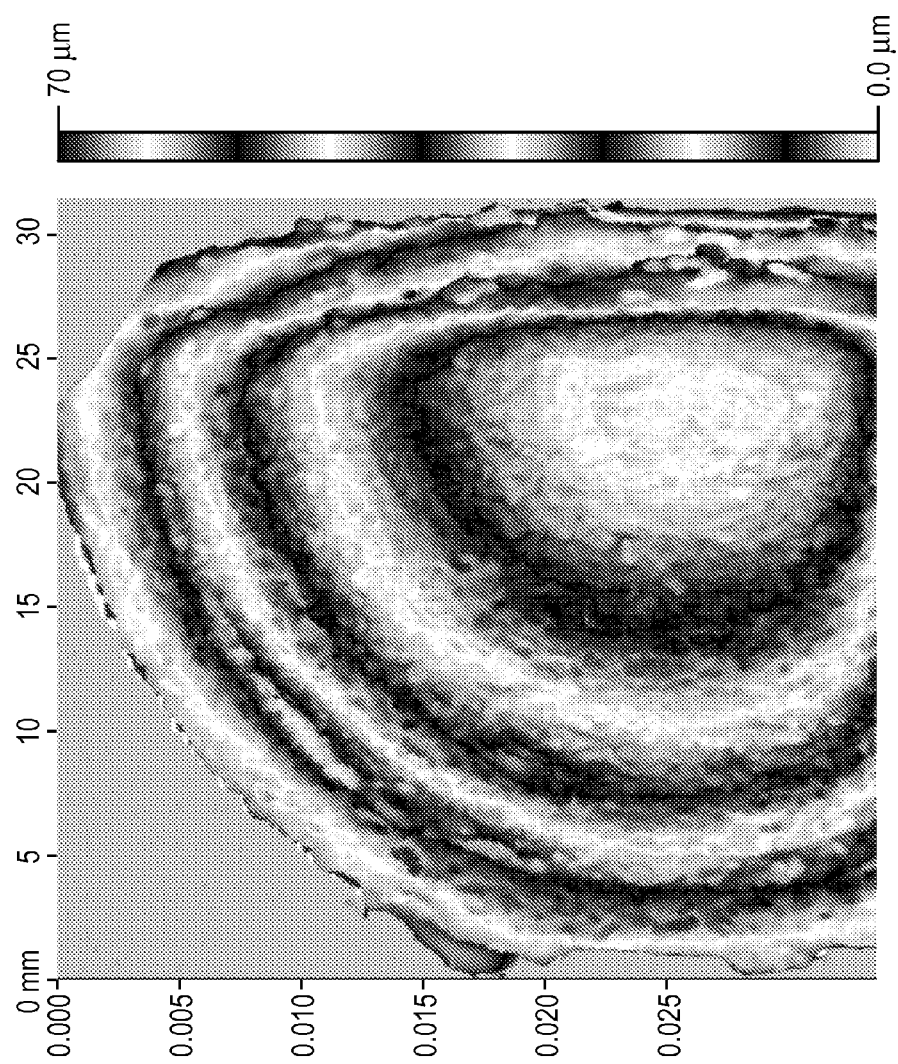
Figure 17C:
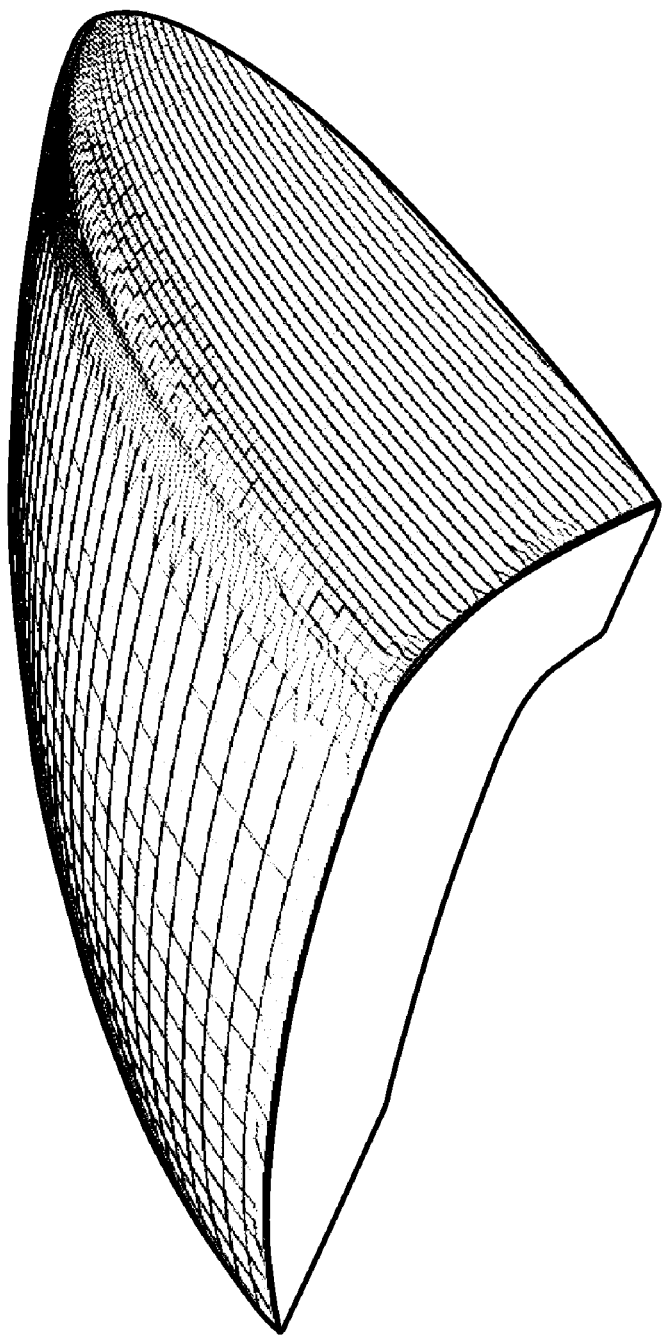
FIG. 17c is a CAD drawing of the par portion printed in FIGS. 17a and 17b.

FIGS. 17a and 17b compare surface finish scans from a VIKING laser profilometer from Solarius. As one may expect, a particulate material with an internal angle of friction that is between 40° and 70° (FIG. 17a) provides a smoother finish than a particulate material with an internal angle of friction greater than 70° (FIG. 17b) where the powder is too cohesive to spread an even layer of particulate material, resulting in an article that has very rough and uneven surface finish. FIG. 17c is a CAD drawing of the formed part illustrated in FIGS. 17a and 17b.

Figure 18A:
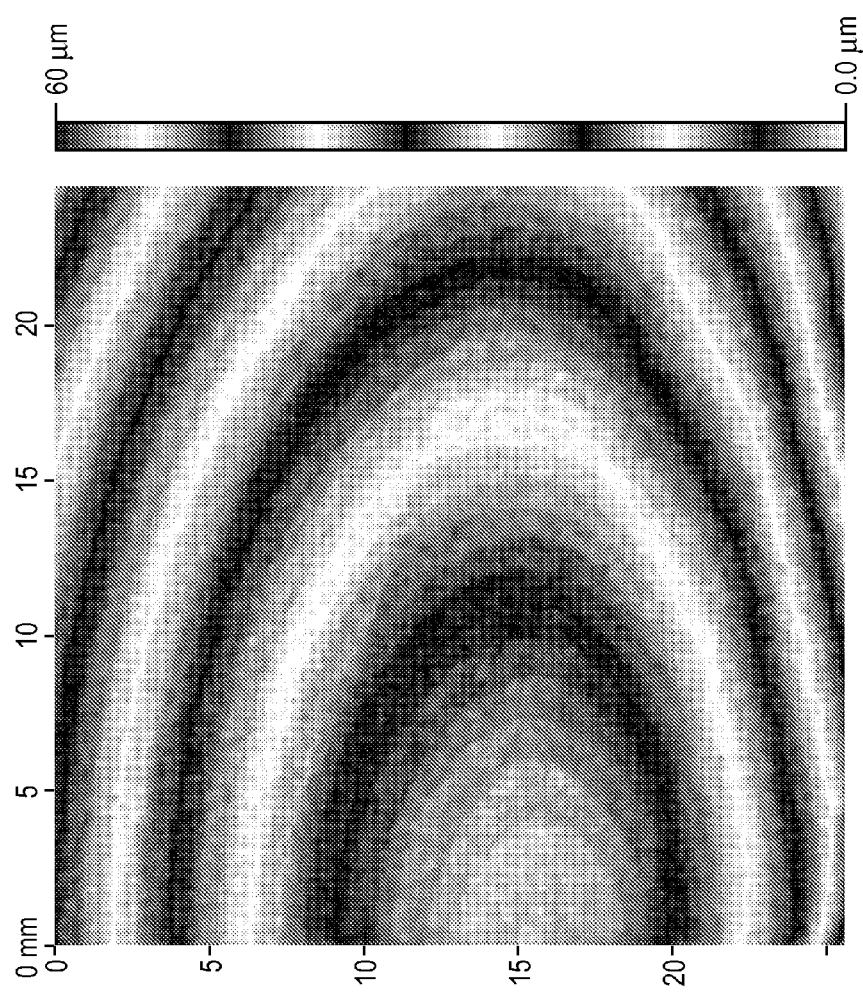
FIGS. 18a and 18b are laser profilometer images comparing the effect of particulate material with low internal angle of friction on finished article properties.
Figure 18B:
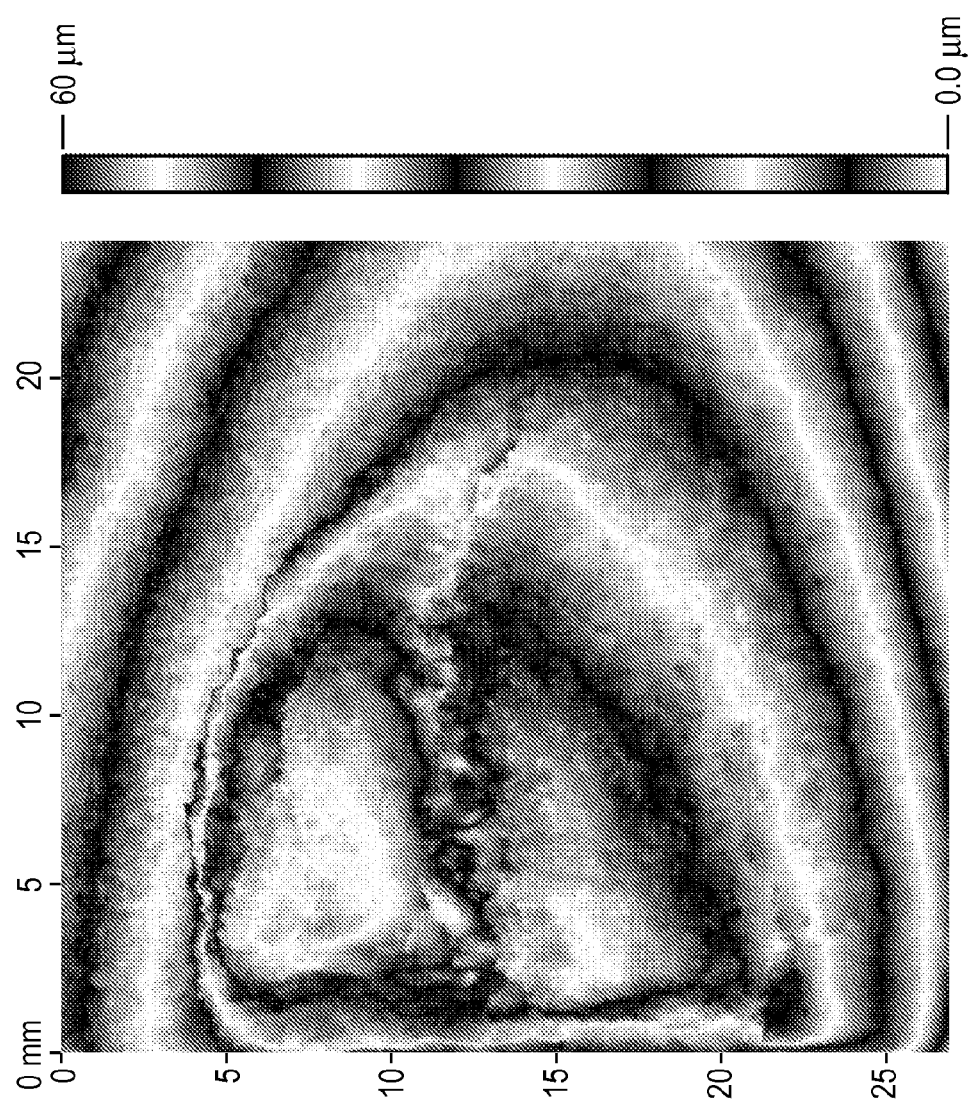
Figure 18C:
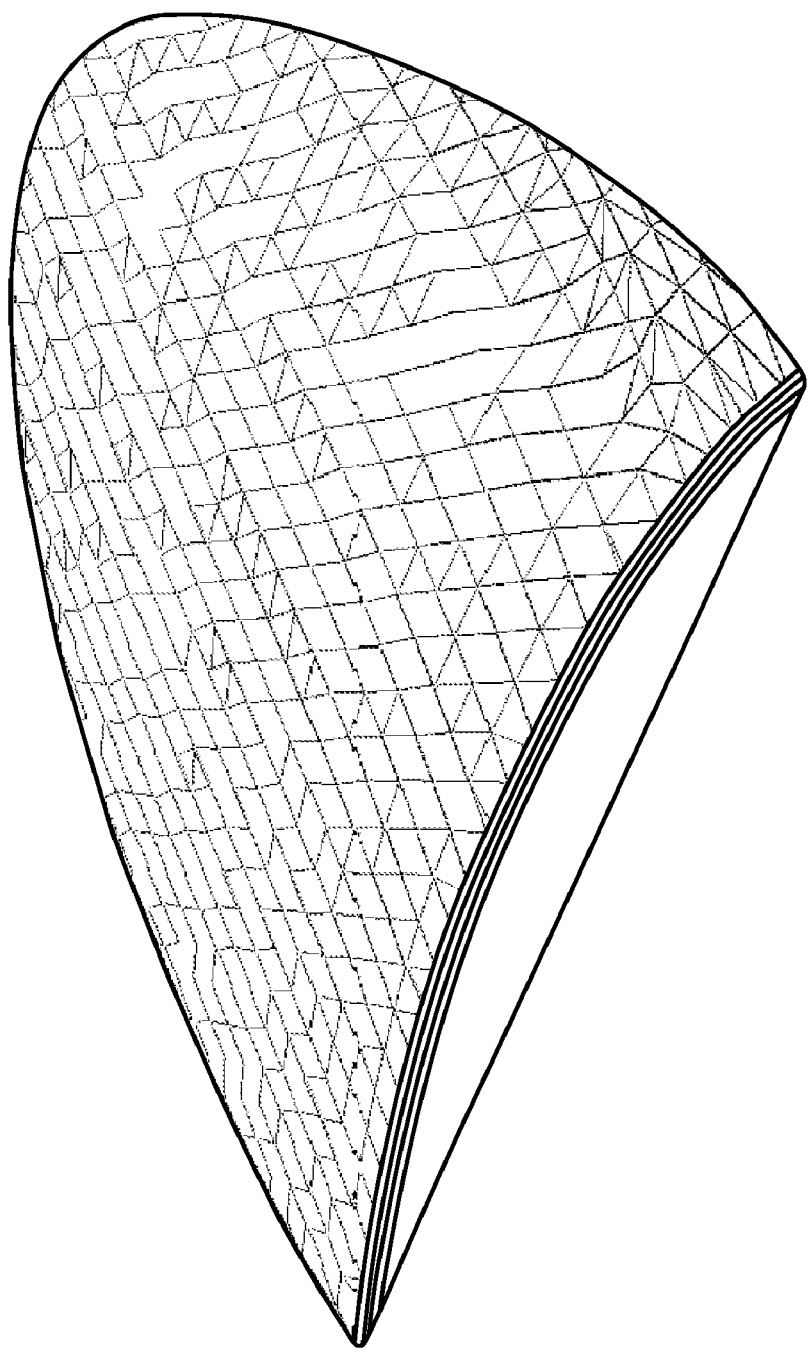
FIG. 18c is a CAD drawing of the part portion printed in FIGS. 18a and 18b.

FIGS. 18a and 18b compare surface finish scans from a VIKING laser profilometer from Solarius. As one may expect, a particulate material with an internal angle of friction that is between 40° and 70° (FIG. 18a) provides a smoother finish than a particulate material with an internal angle of friction less than 40° (FIG. 18b) where the powder is too flowable and unable to resist the spreading forces causing previous printed layers to be displaced, resulting in an article that has a rough and uneven surface finish, or even artifacts missing from the surface of the article because they were displaced. FIG. 18c is a CAD drawing of the formed part illustrated in FIGS. 18a and 18b.

This test is a fairly useful technique for identifying relative performance properties between different candidate materials. The preferred method for evaluating flow properties of candidate build materials during formal optimization after the initial selection period is to test samples of the material on a working three dimensional printer. Certain pathological geometries are known to those experienced in the art, and they can be evaluated either qualitatively or quantitatively. One particularly useful part for observing stability during spreading is a flat plate studded with pegs that are oriented downward during the build. During printing, the earliest layers addressed are a series of disconnected patches that are relatively free to shift in the build material. After these have been formed, a plate is printed that joins all of the pegs together in a single object. One can easily examine whether the pegs are uniform and straight, and one can evaluate the quality of spreading on that basis.

Those skilled in the art will readily appreciate that all compositions and parameters listed herein are meant to be exemplary and actual compositions and parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A powder material system for three dimensional printing comprising:
    a dry particulate material comprising:
        an insoluble filler,
        a soluble filler, and
        a transition metal catalyst,
    wherein the dry particulate material is suitable for use in three dimensional printing to form an article comprised of a plurality of layers, the layers including a reaction product of the particulate material and a non-aqueous fluid that contacts the particulate material during three dimensional printing, the insoluble filler is insoluble in the non-aqueous fluid, the soluble filler is soluble in the non-aqueous fluid, and an internal angle of friction of the particulate material has a value selected from a range of 40° to 70°.

2. A powder material system for three dimensional printing comprising:
    a dry particulate material comprising:
        an insoluble filler,
        a soluble filler, and
        a transition metal catalyst,
    wherein the dry particulate material is suitable for use in three dimensional printing to form an article comprised of a plurality of layers, the layers including a reaction product of the particulate material and a non-aqueous fluid that contacts the particulate material during three dimensional printing, the insoluble filler is insoluble in the non-aqueous fluid, the soluble filler is soluble in the non-aqueous fluid, and a critical surface tension of the particulate material is greater than 20 dynes/cm.

3. A powder material system for three dimensional printing comprising:
    a dry particulate material comprising:
        an insoluble filler,
        a soluble filler, and
        a transition metal catalyst,
    wherein the dry particulate material is suitable for use in three dimensional printing to form an article comprised of a plurality of layers, the layers including a reaction product of the particulate material and a non-aqueous fluid that contacts the particulate material during three dimensional printing, the insoluble filler is insoluble in the non-aqueous fluid, the soluble filler is soluble in the non-aqueous fluid, and the particulate material comprises about 50%-90% by weight of the insoluble filler, about 10-50% by weight of the soluble filler, and about 0.01-0.5% by weight of the transition metal catalyst.

4. A powder material system for three dimensional printing comprising:
    a dry particulate material comprising:
        an insoluble filler,
        a soluble filler selected from the group consisting of methyl methacrylate polymers, ethyl methacrylate polymers, butyl methacrylate polymers, polyvinylbutyral, and combinations thereof, and
        a transition metal catalyst,
    wherein the dry particulate material is suitable for use in three dimensional printing to form an article comprised of a plurality of layers, the layers including a reaction product of the particulate material and a non-aqueous fluid that contacts the particulate material during three dimensional printing, the insoluble filler is insoluble in the non-aqueous fluid, the soluble filler is soluble in the non-aqueous fluid, and the soluble filler has a weight-average molecular weight selected from a range of 100,000 g/mol to 500,000 g/mol.

5. A powder material system for three dimensional printing comprising:
    a dry particulate material comprising:
        an insoluble filler,
        a soluble filler, and
        a transition metal catalyst, and
        a pigment,
    wherein the dry particulate material is suitable for use in three dimensional printing to form an article comprised of a plurality of layers, the layers including a reaction product of the particulate material and a non-aqueous fluid that contacts the particulate material during three dimensional printing, the insoluble filler is insoluble in the non-aqueous fluid, and the soluble filler is soluble in the non-aqueous fluid.

6. The material system of claim 5, wherein the particulate material comprises about 0.5-5% by weight of the pigment.

7. The material system of claim 5, wherein the pigment is selected from the group consisting of zinc oxide, zinc sulfide, barium sulfate, titanium dioxide, zirconium silicate, lead carbonate, and hollow borosilicate glass spheres.

* * * * *